(12) United States Patent
van der Mee et al.

(10) Patent No.: US 9,718,956 B2
(45) Date of Patent: *Aug. 1, 2017

(54) INTERIOR AIRCRAFT COMPONENTS AND METHODS OF MANUFACTURE

(71) Applicant: SABIC GLOBAL TECHNOLOGIES B.V., Bergen op Zoom (NL)

(72) Inventors: Mark Adrianus Johannes van der Mee, Breda (NL); Remco Wirtz, Bergen op Zoom (NL); Roland Sebastian Assink, Middelburg (NL); Robert Dirk van de Grampel, Tholen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 702 days.

This patent is subject to a terminal disclaimer.

(21) Appl. No.: 14/154,737

(22) Filed: Jan. 14, 2014

(65) Prior Publication Data
US 2015/0197632 A1 Jul. 16, 2015

(51) Int. Cl.
| | | |
|---|---|---|
| C08L 69/00 | (2006.01) | |
| C08L 51/08 | (2006.01) | |
| C08F 283/12 | (2006.01) | |
| C08G 77/04 | (2006.01) | |
| C08G 77/448 | (2006.01) | |

(52) U.S. Cl.
CPC ............. *C08L 69/00* (2013.01); *C08L 69/005* (2013.01); *C08F 283/124* (2013.01); *C08G 77/04* (2013.01); *C08G 77/448* (2013.01); *C08L 51/085* (2013.01)

(58) Field of Classification Search
CPC ...... C08L 69/00; C08L 69/005; C08L 51/085; C08F 283/124; C08G 77/04; C08G 77/448
USPC .................................................. 524/494, 537
See application file for complete search history.

(56) References Cited

U.S. PATENT DOCUMENTS

| | | |
|---|---|---|
| 6,399,198 B1 | 6/2002 | Miller et al. |
| 6,723,864 B2 | 4/2004 | Silva et al. |
| 7,232,854 B2 | 6/2007 | Ma et al. |
| 7,498,401 B2 | 3/2009 | Agarwal |
| 7,615,594 B2 | 11/2009 | Hashimoto et al. |
| 7,790,292 B2 | 9/2010 | Colborn et al. |
| 7,994,239 B2 | 8/2011 | Mukawa et al. |
| 8,362,114 B2 | 1/2013 | Maljkovic et al. |
| 9,284,449 B2 | 3/2016 | Sun et al. |
| 9,365,720 B2 * | 6/2016 | Van der Mee .......... C08L 83/10 |
| 2004/0039145 A1 | 2/2004 | Silva et al. |
| 2004/0220330 A1 | 11/2004 | DeRudder et al. |
| 2007/0149661 A1 | 6/2007 | Charati et al. |
| 2007/0191518 A1 * | 8/2007 | Chen ....................... C08L 69/00 524/155 |
| 2009/0306258 A1 | 12/2009 | Siripurapu et al. |
| 2010/0075125 A1 | 3/2010 | Maas et al. |
| 2012/0251750 A1 | 10/2012 | Sybert et al. |
| 2013/0131241 A1 | 5/2013 | Van De Grampel et al. |
| 2013/0317145 A1 | 11/2013 | An et al. |
| 2014/0124709 A1 | 5/2014 | Zheng et al. |
| 2015/0079375 A1 | 3/2015 | Yang et al. |
| 2015/0197633 A1 | 7/2015 | Van Der Mee et al. |
| 2016/0280912 A1 | 9/2016 | Van Der Mee et al. |

FOREIGN PATENT DOCUMENTS

| | | | |
|---|---|---|---|
| CN | 101962472 A | 2/2011 | |
| EP | 2634219 A1 | 9/2013 | |
| WO | 2013020004 A1 | 2/2013 | |
| WO | 2013170456 A1 | 11/2013 | |
| WO | WO 2013170456 A1 * | 11/2013 | ............ C08L 69/005 |
| WO | 2015065611 A1 | 5/2015 | |
| WO | 2015107469 A1 | 7/2015 | |
| WO | 2013177558 A1 | 11/2015 | |
| WO | 2015193860 A1 | 12/2015 | |
| WO | 2016011334 A1 | 1/2016 | |

OTHER PUBLICATIONS

International Search Report for International Application No. PCT/IB2015/050286, International Application filing Date Jan. 14, 2015; Date of Mailing Apr. 13, 2015; 4 pages.
Written Opinion for International Application No. PCT/IB2015/050286, International Application Filing Date Jan. 14, 2015; Date of Mailing Apr. 13, 2015; 6 pages.
Ho, K.C., et al.; Journal of Reinforced Plastics and Composites, 1997, p. 903-925.
Abele et al., "Silicone Based Flame Retardant for Polycarbonate", ANTEC, 2009, pp. 1351-1354.
Dibenedetto, A.T., "Tailoring of interfaces in glass fiber reinforced polymer composites: a review", Materials Science and Engineering: A, vol. 302, Issue 1, 2001, pp. 74-82.
Kambour et al.; "Tough, Transparent Heat- and Flame-Resistant Thermoplastics via Silicone Block-Modified Bisphenol Fluorenone Polycarbonate"; Journal of Applied Polymer Science; vol. 20; 1976; pp. 3275-3293.
Levchik et al., "Overview of recent developments in the flame retardancy of polycarbonates", Polymer International, vol. 54, 2005, pp. 981-998.
Okada et al., "Biodegradable polymers based on renewable resources. VI. Synthesis and biodegradability of poly (ester carbon (Continued)

*Primary Examiner* — Ling Choi
*Assistant Examiner* — Chun-Cheng Wang
(74) *Attorney, Agent, or Firm* — Cantor Colburn LLP

(57) ABSTRACT

A aircraft component comprises a polycarbonate composition comprising: a first polycarbonate selected from a polycarbonate homopolymer, a poly(aliphatic ester-carbonate), or a combination thereof; a second polymer different from the first polycarbonate, the second polymer comprising a poly(carbonate-siloxane) copolymer, a polydialkylsiloxane, a silicone graft copolymer, or a combination thereof, wherein siloxane units in the second polymer are present in the polycarbonate composition in an amount of 0.3 to 3 wt. %, based on the total weight of the polycarbonate composition; and 10 to 50 wt. % of glass fiber, based on the total weight of the polycarbonate composition.

33 Claims, No Drawings

(56) References Cited

OTHER PUBLICATIONS ate)s containing 1,4:3,6-dianhydro-D-glucitol and sebacic acid units", Journal of App Polymer Science, vol. 86, 2002, pp. 872-880.

* cited by examiner

INTERIOR AIRCRAFT COMPONENTS AND METHODS OF MANUFACTURE

BACKGROUND

This disclosure generally relates to components for aircrafts, and in particular aircraft components having low ASTM E662 smoke density and good 60 second vertical burn properties.

Flame retardant (FR) polymers and polymer blends, for example polycarbonates and polycarbonate blends with UL V0 and 5VA and B Underwriters Laboratories flammability ratings are widely prepared and used, especially in a wide variety of electrical and electronic applications. Conversely, only a very limited set of polycarbonates are used in aircraft applications particularly interior parts such as windows, partition walls, ceiling panels, cabinet walls, storage compartments, galley surfaces, light panels, and the like. All of these applications have stringent flammability safety requirements that the polycarbonates must meet. For example, the safety standards for aircraft and transportation systems used in the United States include an ASTM E662 smoke density test and 60 second vertical burn tests including flame time, burning drip time and burn length specified in Federal Aviation Regulation (FAR) 25.853. Requirements can vary per manufacturer, but typically parts with a surface area of less than 1 square feet have to meet requirements on ASTM E662 smoke density and 60 second vertical burn, while larger parts have to fulfill these requirements and additional requirements on OSU (Ohio State University) heat release. In another example, the aircraft manufacturer Airbus has smoke density and other safety requirements set forth in ABD0031. In the event of a fire, components made from materials having these properties can increase the amount of time available for escape and provide for better visibility during a fire.

Despite extensive investigation, a need still exists for improved materials that meet governmental and aircraft manufacturer flame safety requirements and that have good mechanical properties, including high stiffness, high strength, good impact, and good processability.

BRIEF SUMMARY

In an embodiment, an aircraft component, wherein the component is a molded or extruded interior aircraft component comprises a polycarbonate composition comprising: a first polycarbonate selected from a polycarbonate homopolymer, a poly(aliphatic ester-carbonate), or a combination comprising at least one of the foregoing; a second polymer different from the first polycarbonate, the second polymer comprising a poly(carbonate-siloxane) copolymer, a polydialkylsiloxane, a silicone graft copolymer, or a combination comprising at least one of the foregoing, wherein siloxane units in the second polymer are present in the polycarbonate composition in an amount of 0.3 to 3 wt. %, based on the total weight of the polycarbonate composition; and 10 to 50 wt. % of glass fiber, based on the total weight of the polycarbonate composition; wherein a sample of the polycarbonate composition has: an ASTM E662 smoke test Ds-1.5 value of less than 100 and DS-4 value of less than 200 when measured at a thickness of 3 mm, a flame time of less than 15 seconds, a burn length of less than 152 mm, and a drip extinguishing time of less than 5 seconds, each measured using the method of FAR F25.5, in accordance with FAR 25.853(a) at a thickness of 3 mm.

The above described and other features are exemplified by the following Detailed Description, and Examples.

DETAILED DESCRIPTION

The inventors hereof have developed aircraft components. These components have low smoke density characteristics, in particular Ds-1.5 and Ds-4 measured according to ASTM E662, and low vertical burn characteristics, in particular improved flame time, burning drip time, and burn length measured using the method of FAR F25.5, and can unexpectedly be obtained by use of preferred polycarbonate compositions. Thus, it has been discovered that the addition of a small amount of poly(carbonate-siloxane) copolymer, a polydialkylsiloxane, a silicone graft copolymer, or a combination comprising at least one of the foregoing to compositions comprising glass fiber and linear or branched polycarbonate homopolymers and/or polycarbonate copolymers with inherently high smoke has a highly positive effect on the smoke density properties of these compositions.

The results are surprising because the positive effect is only obtained when the siloxane unit type is aliphatic, and not when it is aromatic. This is contradictory to commonly applied flame retardant approaches in polycarbonate for UL performance, where typically aromatic siloxanes, such as polymethylphenylsiloxane or octaphenylcyclotretrasiloxane, rather than aliphatic siloxanes are used.

Applicants have also found that the presence of glass fiber in the composition improves vertical burn properties. For example, the compositions containing only polycarbonate and poly(carbonate-siloxane) copolymer may not necessarily meet the FAR 25.853 requirements for vertical burn. However, the addition of glass fiber improves vertical burn properties and results in compositions meeting all requirements for vertical burn according to FAR 25.853.

With this discovery, it is now possible to manufacture interior aircraft components having the required low smoke densities (Ds-4) measured according to ASTM E662 and vertical burn properties measured using the method of FAR F25.5, in accordance with FAR 25.853(a) at a thickness of 3 mm.

In a further advantageous feature, the interior aircraft components can have high tensile modulus and high tensile strength, which make them suitable for applications requiring strength and stiffness.

The polycarbonate compositions can also be formulated to have low melt viscosities, which renders them suitable for injection molding. In particular, a molded or extruded interior aircraft component can comprise a polycarbonate composition comprising: a first polymer selected from a linear polycarbonate homopolymer, a poly(aliphatic ester-carbonate), or a combination comprising at least one of the foregoing; a second polymer different from the first polycarbonate, the second polymer comprising a poly(carbonate-siloxane) copolymer, a polydialkylsiloxane, a silicone graft copolymer, or a combination comprising at least one of the foregoing, wherein siloxane units in the second polymer are present in the composition in an amount of 0.3 to 3 wt. %, based on the total weight of the composition; and 10 to 50 wt. % of glass fiber, based on the total weight of the composition; wherein a sample of the polycarbonate composition has: an ASTM E662 smoke test Ds-1.5 value of less than 100 and DS-4 value of less than 200 when measured at a thickness of 3 mm, a flame time of less than 15 seconds, a burn length of less than 152 mm, and a drip extinguishing time of less than 5 seconds, each measured using the method of FAR F25.5, in accordance with FAR 25.853(a) at a thickness of 3 mm.

In a particularly advantageous feature, the polycarbonate compositions can have an ASTM E662 smoke test Ds-1.5 value of less than 100 and DS-4 value of less than 200 when measured at a thickness of 3 mm, a flame time of less than 15 seconds, a burn length of less than 152 mm, and a drip extinguishing time of less than 5 seconds, each measured using the method of FAR F25.5, in accordance with FAR 25.853(a) at a thickness of 3 mm, while allowing sufficient melt flow for injection molding of relatively large parts, while simultaneously having high stiffness, high strength and retaining sufficient practical impact resistance characteristics.

As used herein, the term "polycarbonate" and "polycarbonate polymer" refers to compounds comprising bisphenol carbonate units of formula (1)

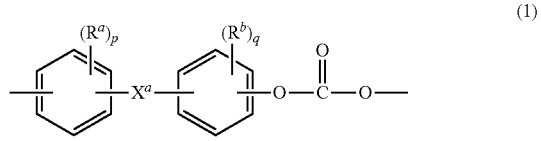
(1)

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a bridging group between the two arylene groups, and is a single bond, —O—, —S—, —S(O)—, —S(O)$_2$—, —C(O)—, a $C_{1-11}$ alkylidene of the formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group. Exemplary $X^a$ groups include methylene, ethylidene, neopentylidene, and isopropylidene. The bridging group $X^a$ and the carbonate oxygen atoms of each $C_6$ arylene group can be disposed ortho, meta, or para (preferably para) to each other on the $C_6$ arylene group.

In a preferred embodiment, $R^a$ and $R^b$ are each independently a $C_{1-3}$ alkyl group, p and q are each independently 0 to 1, and $X^a$ is a single bond, —O—, —S(O)—, —S(O)$_2$—, —C(O)—, a $C_{1-9}$ alkylidene of formula —C($R^c$)($R^d$)— wherein $R^c$ and $R^d$ are each independently hydrogen or $C_{1-8}$ alkyl, or a group of the formula —C(=$R^e$)— wherein $R^e$ is a divalent $C_{1-9}$ hydrocarbon group. In another preferred embodiment, $R^a$ and $R^b$ are each independently a methyl group, p and q are each independently 0 to 1, and $X^a$ is a single bond, a $C_{1-7}$ alkylidene of formula —C($R^c$)($R^d$)— wherein $R^c$ and $R^d$ are each independently hydrogen or $C_{1-6}$ alkyl. In an embodiment, p and q is each 1, and $R^a$ and $R^b$ are each a $C_{1-3}$ alkyl group, preferably methyl, disposed meta to the oxygen on each ring. The bisphenol carbonate units (1) can be derived from bisphenol A, where p and q are both 0 and $X^a$ is isopropylidene.

The polycarbonate units in the homopolymers or copolymers can be produced from dihydroxy compounds of the formula (2)

(2)

wherein $R^1$ is a bridging moiety. Thus, the bisphenol carbonate units (1) are generally produced from the corresponding bisphenol compounds of formula (3)

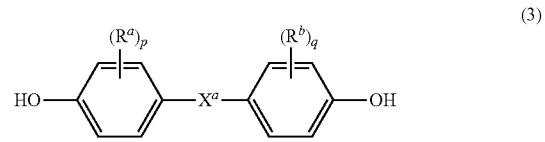
(3)

wherein $R^a$ and $R^b$, p and q, and $X^a$ are the same as in formula (1).

Some illustrative examples of preferred bisphenol compounds that can be used to produce units (1) include 4,4'-dihydroxybiphenyl, bis(4-hydroxyphenyl)methane, 1,2-bis(4-hydroxyphenyl)ethane, 2-(4-hydroxyphenyl)-2-(3-hydroxyphenyl)propane, 1,2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, bis(4-hydroxyphenyl)ether, bis(4-hydroxyphenyl)sulfide, bis(4-hydroxyphenyl)sulfoxide, bis(4-hydroxyphenyl)sulfone, or a combination comprising at least one of the foregoing bisphenolic compounds.

Preferred examples of bisphenol compounds that can be used in the production of bisphenol carbonate units (1) include 1,1-bis(4-hydroxyphenyl) methane, 1,1-bis(4-hydroxyphenyl) ethane, 2,2-bis(4-hydroxyphenyl) propane ("bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, and combinations comprising at least one of the foregoing bisphenol compounds.

Polycarbonates can be manufactured by processes such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 10. The water immiscible solvent can be, for example, methylene chloride, 1,2-dichloroethane, chlorobenzene, toluene, and the like.

Exemplary carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an embodiment, an interfacial polymerization reaction to form carbonate linkages uses phosgene as a carbonate precursor, and is referred to as a phosgenation reaction.

Among tertiary amines that can be used are aliphatic tertiary amines such as triethylamine and tributylamine, cycloaliphatic tertiary amines such as N,N-diethyl-cyclohexylamine, and aromatic tertiary amines such as N,N-dimethylaniline. Among the phase transfer catalysts that can be used are catalysts of the formula $(R^3)_4Q^+X^-$, wherein each $R_3$ is the same or different, and is a $C_{1-10}$ alkyl group;

Q is a nitrogen or phosphorus atom; and X is a halogen atom or a $C_{1-8}$ alkoxy group or $C_{6-18}$ aryloxy group. Exemplary phase transfer catalysts include $(CH_3(CH_2)_3)_4N^+X^-$, $(CH_3(CH_2)_3)_4P^+X^-$, $(CH_3(CH_2)_5)_4N^+X^-$, $(CH_3(CH_2)_6)_4N^+X^-$, $(CH_3(CH_2)_4)_4N^+X^-$, $CH_3(CH_3(CH_2)_2)_3N^+X^-$, and $CH_3(CH_3(CH_2)_2)_3N^+X^-$, wherein X is $Cl^-$, $Br^-$, a $C_{1-8}$ alkoxy group or a $C_{6-18}$ aryloxy group. An effective amount of a phase transfer catalyst can be 0.1 to 10 wt. %, or 0.5 to 2 wt. %, each based on the weight of bisphenol in the phosgenation mixture.

Alternatively, melt processes can be used to make the polycarbonates. Melt polymerization may be conducted as a batch process or as a continuous process. In either case, the melt polymerization conditions used may comprise two or more distinct reaction stages, for example, a first reaction stage in which the starting dihydroxy aromatic compound and diaryl carbonate are converted into an oligomeric polycarbonate and a second reaction stage wherein the oligomeric polycarbonate formed in the first reaction stage is converted to high molecular weight polycarbonate. Such "staged" polymerization reaction conditions are especially suitable for use in continuous polymerization systems wherein the starting monomers are oligomerized in a first reaction vessel and the oligomeric polycarbonate formed therein is continuously transferred to one or more downstream reactors in which the oligomeric polycarbonate is converted to high molecular weight polycarbonate. Typically, in the oligomerization stage the oligomeric polycarbonate produced has a number average molecular weight of about 1,000 to about 7,500 Daltons. In one or more subsequent polymerization stages the number average molecular weight (Mn) of the polycarbonate is increased to between about 8,000 and about 25,000 Daltons (using polycarbonate standard).

The term "melt polymerization conditions" is understood to mean those conditions necessary to effect reaction between a dihydroxy aromatic compound and a diaryl carbonate in the presence of a transesterification catalyst. Typically, solvents are not used in the process, and the reactants dihydroxy aromatic compound and the diaryl carbonate are in a molten state. The reaction temperature can be about 100° C. to about 350° C., preferably about 180° C. to about 310° C. The pressure may be at atmospheric pressure, supra-atmospheric pressure, or a range of pressures from atmospheric pressure to about 15 torr in the initial stages of the reaction, and at a reduced pressure at later stages, for example about 0.2 to about 15 torr. The reaction time is generally about 0.1 hours to about 10 hours.

The diaryl carbonate ester can be diphenyl carbonate, or an activated diphenyl carbonate having electron-withdrawing substituents on the aryl groups, such as bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing.

Catalysts used in the melt polymerization of polycarbonates can include alpha or beta catalysts. Beta catalysts are typically volatile and degrade at elevated temperatures. Beta catalysts are therefore preferred for use at early low-temperature polymerization stages. Alpha catalysts are typically more thermally stable and less volatile than beta catalysts.

The alpha catalyst can comprise a source of alkali or alkaline earth ions. The sources of these ions include alkali metal hydroxides such as lithium hydroxide, sodium hydroxide, and potassium hydroxide, as well as alkaline earth hydroxides such as magnesium hydroxide and calcium hydroxide. Other possible sources of alkali and alkaline earth metal ions include the corresponding salts of carboxylic acids (such as sodium acetate) and derivatives of ethylene diamine tetraacetic acid (EDTA) (such as EDTA tetrasodium salt, and EDTA magnesium disodium salt). Other alpha transesterification catalysts include alkali or alkaline earth metal salts of a non-volatile inorganic acid such as $NaH_2PO_3$, $NaH_2PO_4$, $Na_2HPO_3$, $KH_2PO_4$, $CsH_2PO_4$, $Cs_2HPO_4$, and the like, or mixed salts of phosphoric acid, such as $NaKHPO_4$, $CsNaHPO_4$, $CsKHPO_4$, and the like. Combinations comprising at least one of any of the foregoing catalysts can be used.

Possible beta catalysts can comprise a quaternary ammonium compound, a quaternary phosphonium compound, or a combination comprising at least one of the foregoing. The quaternary ammonium compound can be a compound of the structure $(R^4)_4N^+X^-$, wherein each $R^4$ is the same or different, and is a $C_{1-20}$ alkyl group, a $C_{4-20}$ cycloalkyl group, or a $C_{4-20}$ aryl group; and $X^-$ is an organic or inorganic anion, for example a hydroxide, halide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing. Tetramethyl ammonium hydroxide is often used. The quaternary phosphonium compound can be a compound of the structure $(R^5)_4P^+X^-$, wherein each $R^5$ is the same or different, and is a $C_{1-20}$ alkyl group, a $C_{4-20}$ cycloalkyl group, or a $C_{4-20}$ aryl group; and $X^-$ is an organic or inorganic anion, for example a hydroxide, halide, carboxylate, sulfonate, sulfate, formate, carbonate, or bicarbonate. Where $X^-$ is a polyvalent anion such as carbonate or sulfate it is understood that the positive and negative charges in the quaternary ammonium and phosphonium structures are properly balanced. For example, where $R^{20}$-$R^{23}$ are each methyl groups and $X^-$ is carbonate, it is understood that $X^-$ represents $2(CO_3^{-2})$. Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate, tetraphenyl phosphonium phenoxide, and combinations comprising at least one of the foregoing. TBPA is often used.

The amount of alpha and beta catalyst used can be based upon the total number of moles of dihydroxy compound used in the polymerization reaction. When referring to the ratio of beta catalyst, for example a phosphonium salt, to all dihydroxy compounds used in the polymerization reaction, it is convenient to refer to moles of phosphonium salt per mole of the dihydroxy compound, meaning the number of moles of phosphonium salt divided by the sum of the moles of each individual dihydroxy compound present in the reaction mixture. The alpha catalyst can be used in an amount sufficient to provide $1 \times 10^{-2}$ to $1 \times 10^{-8}$ moles, preferably, $1 \times 10^{-4}$ to $1 \times 10^{-7}$ moles of metal per mole of the dihydroxy compounds used. The amount of beta catalyst (e.g., organic ammonium or phosphonium salts) can be $1 \times 10^{-2}$ to $1 \times 10^{-5}$, preferably $1 \times 10^{-3}$ to $1 \times 10^{-4}$ moles per total mole of the dihydroxy compounds in the reaction mixture.

Branched polycarbonate or branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Preferred examples include trimellitic acid, trimellitic anhydride, trimellitic trichloride, tris-p-hydroxy phenyl ethane, isatin-bis-phenol, tris-phenol TC (1,3,5-tris ((p-hydroxyphenyl)isopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of about 0.05 to about 5 wt. %. Combinations comprising linear polycarbonates and branched polycarbonates can be used.

All types of polycarbonate end groups are contemplated as being useful in the polycarbonate composition, provided that such end groups do not significantly adversely affect desired properties of the compositions. A chain stopper (also referred to as a capping agent) can be included during polymerization. The chain stopper limits molecular weight growth rate, and so controls molecular weight in the polycarbonate. Exemplary chain stoppers include certain monophenolic compounds, mono-carboxylic acid chlorides, and/ or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be preferably mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloro formates, such as phenyl chloro formate, alkyl-substituted phenyl chloro formate, p-cumyl phenyl chloroformate, toluene chloroformate, and combinations thereof.

In an embodiment, the first polycarbonate is a bisphenol A polycarbonate homopolymer. In another embodiment, the first polycarbonate is a branched polycarbonate comprising units as described above; greater than or equal to 0.2 mole %, based on the total moles of the polycarbonate, of moieties derived from a branching agent; and end-capping groups derived from an end-capping agent having a pKa between about 8.3 and about 11. The branching agent can comprise trimellitic trichloride, 1,1,1-tris(4-hydroxyphenyl)ethane or a combination of trimellitic trichloride and 1,1,1-tris(4-hydroxyphenyl)ethane, and the end-capping agent is phenol or a phenol containing a substituent of cyano group, aliphatic groups, olefinic groups, aromatic groups, halogens, ester groups, ether groups, or a combination comprising at least one of the foregoing. In a preferred embodiment, the end-capping agent is phenol, p-t-butylphenol, p-methoxyphenol, p-cyanophenol, p-cumylphenol, or a combination comprising at least one of the foregoing.

The poly(aliphatic ester-carbonate) is derived from a linear $C_{6-20}$ aliphatic dicarboxylic acid, preferably a linear $C_6$-$C_{12}$ aliphatic dicarboxylic acid. Preferred dicarboxylic acids include n-hexanedioic acid (adipic acid), n-decanedioic acid (sebacic acid), and alpha, omega-$C_{12}$ dicarboxylic acids such as dodecanedioic acid (DDDA). As is known in the art, a derivative of the acids can be used during manufacture, for example the corresponding acid halide or acid anhydride, and the terms "derived from a dicarboxylic acid" includes esters derived from such derivatives. A preferred poly(aliphatic ester)-polycarbonate is of formula:

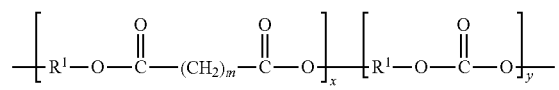

wherein each $R^1$ can be the same or different, and is as described in formula (1), m is 4 to 18, preferably 4 to 10, and the average molar ratio of ester units to carbonate units x:y is 99:1 to 1:99, including 13:87 to 2:98, or 9:91 to 2:98, or 8:92 to 2:98. In a preferred embodiment, the poly(aliphatic ester)-polycarbonate copolymer comprises bisphenol A sebacate ester units and bisphenol A carbonate units, having, for example an average molar ratio of x:y of 2:98 to 8:92, for example 6:94. Such poly(aliphatic ester-carbonate)s are commercially available as LEXAN HFD from the Innovative Plastics Division of SABIC (LEXAN is a trademark of SABIC IP B. V.).

The poly(aliphatic ester-carbonate) can have a weight average molecular weight of 15,000 to 40,000 Dalton (Da), including 20,000 to 38,000 Da, as measured by GPC based on BPA polycarbonate standards.

The second polymer is different from the first polycarbonate and comprises a poly(carbonate-siloxane) copolymer, a polydialkylsiloxane, a silicone graft copolymer, or a combination comprising at least one of the foregoing, wherein siloxane units in the second polymer are present in the composition in an amount of 0.3 to 3 wt. %, based on the total weight of the composition.

The polydialkylsiloxanes are silicone oils of low volatility, for example silicone oils with a viscosity of from 10 millipascal-second (mPa-s, also known as centipoise, cps) to 100,000,000 mPa-s at 25° C. are preferable, and silicone oils with a viscosity of from 20 mPa-s to 10,000,000 mPa-s at 25° C. Examples of such silicone oils include oils having linear, partially branched linear, cyclic, or branched molecular structures, with oils having linear or cyclic structures being preferably mentioned. The silicone oils have no, or substantially no reactive groups, for example no alkenyl groups, no silicon-bonded hydrogen atoms, no silanol groups, and no silicon-bonded hydrolyzable groups. The alkyl groups can be the same or different and can have 1 to 10 carbon atoms, 1 to 6 carbon atoms, or 1 to 3 carbon atoms. In an embodiment, the silicone oil is a polydimethylsiloxane, for example a polydimethylsiloxane having a viscosity from 50 to 1,000 mPa-s at 25° C.

The poly(carbonate-siloxane) copolymers, also referred to as "PC-siloxane," can contain bisphenol carbonate units (1) and repeating siloxane units (also known as "diorganosiloxane units"). The siloxane units can be polysiloxane units of formula (9)

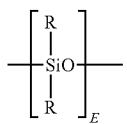

(9)

wherein each R is independently a $C_{1-13}$ monovalent hydrocarbyl group. For example, each R can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no halogens are present. Combinations of the foregoing R groups can be used in the same copolymer. In an embodiment, the polysiloxane comprises R groups that have minimal hydrocarbon content. In a preferred embodiment, an R group with a minimal hydrocarbon content is a methyl group.

The average value of E in formula (9) can vary widely depending on the type and relative amount of each component in the polycarbonate composition, whether the polymer is linear, branched or a graft copolymer, the desired properties of the composition, and like considerations. In an embodiment, E has an average value of 2 to 500, 2 to 200, or 5 to 120, 10 to 100, 10 to 80, 2 to 30, or 30 to 80. In an embodiment E has an average value of 16 to 50, more preferably 20 to 45, and even more preferably 25 to 45. In another embodiment, E has an average value of 4 to 50, 4 to 15, preferably 5 to 15, more preferably 6 to 15, and still more preferably 7 to 10. In an embodiment, the polysiloxane units are structural units of formula (9a)

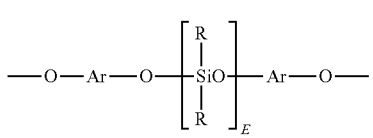

(9a)

wherein E is as defined above; each R can independently be the same or different, and is as defined above; and each Ar can independently be the same or different, and is a substituted or unsubstituted $C_{6-30}$ compound containing an aromatic group, wherein the bonds are directly connected to the aromatic moiety. The Ar groups in formula (9a) can be derived from a $C_{6-30}$ dihydroxy aromatic compound, for example a bisphenol compound as described above or a monoaryl dihydroxy compound (6) above. Combinations comprising at least one of the foregoing dihydroxy aromatic compounds can also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used. In an embodiment, the dihydroxy aromatic compound is unsubstituted, or is does not contain non-aromatic hydrocarbyl substituents such as alkyl, alkoxy, or alkylene substituents.

In a preferred embodiment, where Ar is derived from resorcinol, the polysiloxane units are of the formula (9a-1)

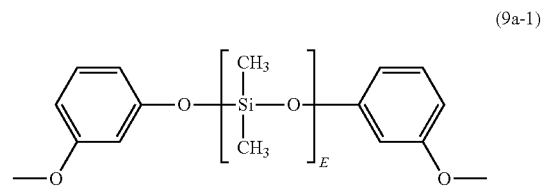

(9a-1)

or, where Ar is derived from bisphenol A, the polysiloxane has the formula (9a-2)

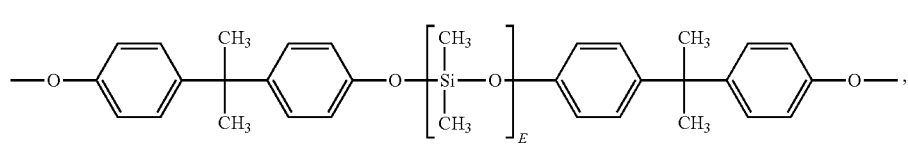

(9a-2)

or a combination comprising at least one of the foregoing can be used, wherein E has an average value as described above, preferably an average value of 2 to 200, 2 to 90, 2 to 50, 2 to 30, 5 to 15, or 7 to 10.

In another embodiment, polydiorganosiloxane units are units of formula (9b)

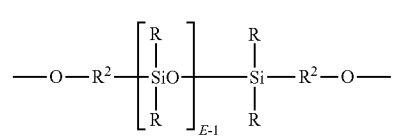

(9b)

wherein R and E are as described for formula (9), and each $R^2$ is independently a divalent $C_{1-30}$ alkylene or $C_{7-30}$ arylene-alkylene. In a preferred embodiment, where $R^2$ is $C_{7-30}$ arylene-alkylene, the polydiorganosiloxane units are of formula (9b-1)

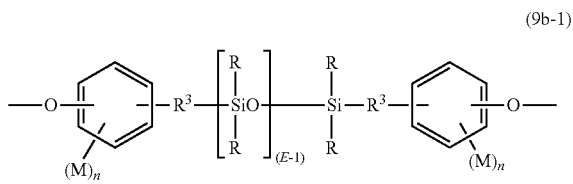

wherein R and E are as defined for formula (9), and each $R^3$ is independently a divalent $C_{2-8}$ aliphatic group. Each M in formula (25) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4. In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl. The foregoing poly(carbonate-siloxane) copolymers can be manufactured by the methods described in U.S. Pat. No. 6,072,011 to Hoover, for example.

In a preferred embodiment, the polysiloxane units are eugenol-capped polysiloxane units of formula (9b-2)

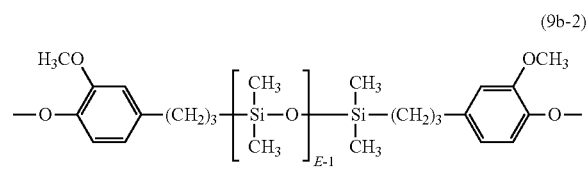

where E has an average value as described above, preferably 2 to 200, 2 to 100, 2 to 90, 2 to 80, or 2 to 30, 20 to 20, or 30 to 80. In another preferred embodiment, the polysiloxane units are of formula (9b-3) or (9b-4)

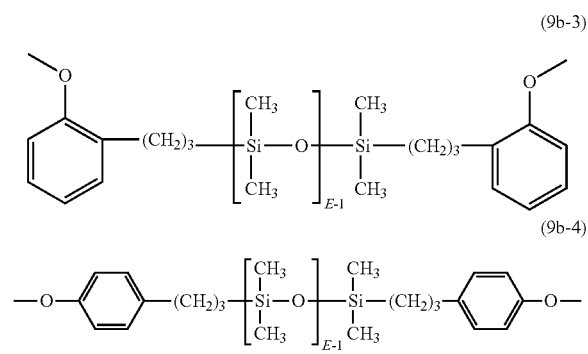

where E has an average value as defined above, preferably an average value of 2 to 200, 2 to 90, 2 to 50, 2 to 30, 5 to 15, or 7 to 10.

The relative amount of carbonate units (1) and polysiloxane units (9) in the PC-siloxane copolymers depends on the desired properties of the polycarbonate composition, such as impact, smoke density, heat release, and melt viscosity. In particular the polycarbonate copolymer is selected to have an average value of E that provides good impact and/or transparency properties, as well as to provide the desired weight percent of siloxane units in the polycarbonate composition. For example, the polycarbonate copolymers can comprise siloxane units in an amount of 0.3 to 3 weight percent (wt. %), preferably 0.4 to 2 wt. %, or 0.6 to 1.5 wt. % of siloxane, based on the total weight of the polycarbonate composition, with the proviso that the siloxane units are provided by polysiloxane units covalently bonded in the polymer backbone of the polycarbonate copolymer.

A preferred PC-siloxane comprises carbonate units (1) derived from bisphenol A, and second repeating siloxane units (9b-2), (9b-3), (9b-4), or a combination comprising at least one of the foregoing, preferably (9b-2). This polycarbonate copolymer can comprise the siloxane units in an amount of 0.1 to 60 weight percent (wt. %), 0.5 to 55 wt. %, 0.5 to 45 wt. % 0.5 to 30 wt. %, or 0.5 to 20 wt. %, based on the total weight of the polycarbonate copolymer, with the proviso that the siloxane units are covalently bound to the polymer backbone of the polycarbonate copolymer. In an embodiment, the remaining units are bisphenol units (1). Transparency can be achieved in this embodiment when E has an average value of 4 to 50, 4 to 15, preferably 5 to 15, more preferably 6 to 15, and still more preferably 7 to 10. The transparent PC-siloxanes can be manufactured using one or both of the tube reactor processes described in U.S. Patent Application No. 2004/0039145A1 or the process described in U.S. Pat. No. 6,723,864 may be used to synthesize the poly(siloxane-carbonate) copolymers.

These and other methods for the manufacture of the PC-siloxane copolymers are known. The PC-siloxane copolymers can have an intrinsic viscosity, as determined in chloroform at 25° C., of 0.3 to 1.5 deciliters per gram (dl/g), preferably 0.45 to 1.0 dl/g. The PC-siloxane copolymers can have a weight average molecular weight ($M_w$) of 10,000 to 100,000 g/mol, as measured by gel permeation chromatography (GPC) using a cross linked styrene-divinyl benzene column, at a sample concentration of 1 milligram per milliliter, and as calibrated with polycarbonate standards.

The silicone graft copolymer can be a silicon core-shell graft copolymer prepared by grafting ethylenically unsaturated monomers onto a rubbery silicone core, thus forming a rigid shell. Methods for preparing the silicone core-shell graft copolymers are known in the art. For example, silicone core-shell graft copolymers can be prepared by methods disclosed in U.S. Pat. No. 7,615,594, or in Abele et al., "Silicone Based Flame Retardant for Polycarbonate," *ANTEC*, 2009, pp. 1351-1354.

The ethylenically unsaturated monomers used to form the shell are generally a combination of a monofunctional monomer and a copolymerizable polyfunctional monomer. Examples of monofunctional monomers include styrene, a-methylstyrene, halogen or $C_{1-3}$alkyl substituted styrene, acrylonitrile, methacrylonitrile, maleic acid, maleic anhydride, $C_1$-$C_4$alkyl and phenyl N-substituted maleimide, $C_1$-$C_8$alkyl methacrylates, $C_1$-$C_8$alkyl acrylates, and the like. Example of copolymerizable polyfunctional monomers include allyl methacrylate, triallyl cyanurate, triallyl isocyanurate, diallyl phthalate, ethylene glycol dimethacrylate, 1,3-butylene glycol dimethacrylate, divinyl benzene, and the like. Preferred monomers are the $C_1$-$C_8$alkyl methacrylates, $C_1$-$C_8$alkyl acrylates, for example, $C_1$-$C_6$ alkyl methacrylates.

The rubbery silicone core can be prepared by polymerization of a cyclosiloxane in the presence of a curing agent to produce particles. The particles can have an average diameter of 0.1 to 1 micrometer. Examples of cyclosiloxanes include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrosiloxane, octaphenylcyclotetrasiloxane, and the like. Examples of curing agents include reactive silanes, for example trimethoxymethylsilane, tetramethoxysilane, tetraethoxysilane, and the like. The silicone core can comprise 20 to 100 wt % of silicone, or 30 to 95 wt % of silicone, with the remainder of the core being rubber groups.

The rubber content of the silicone-based core-shell graft copolymer can be in the range of 30 to 90% by weight. In some embodiments, the silicone core-shell graft copolymer comprises more than 70 wt %, or 60 to 80 wt %, or 60 to 70 wt %, or 65 to 75 wt % of the silicone core component, wherein the graft shell component is derived from primarily $C_1$-$C_6$alkyl methacrylates. A commercially available silicone core-shell graft copolymer is sold under the tradename KANE ACE™ MR-01 by Kaneka Corporation (Japan).

In addition to the first polycarbonate and the second polymer, the polycarbonate composition further comprises glass fibers. Suitable glass fibers include those having nominal filament diameters of about 4.0 to about 35.0 micrometers or 5.0 to 30.0 micrometers. The filaments are made by standard processes, e.g., by steam or air blowing, flame blowing, and mechanical pulling. Exemplary filaments are made by mechanical pulling. Use of non-round fiber cross sections is also possible. The glass fibers may be sized or unsized. Sized glass fibers are coated on their surfaces with a sizing composition selected for compatibility with the polycarbonate. The sizing composition facilitates wet-out and wet-through of the polycarbonate upon the fiber strands and assists in attaining desired physical properties in the polycarbonate composition.

The glass fibers are preferably glass strands that have been sized. In preparing the glass fibers, a number of filaments can be formed simultaneously, sized with the coating agent, and then bundled into what is called a strand. Alternatively the strand itself may be first formed of filaments and then sized. The amount of sizing employed is generally that amount which is sufficient to bind the glass filaments into a continuous strand and ranges from about 0.1 to about 5 wt. %, about 0.1 to 2 wt. % based on the weight of the glass fibers. Generally, this may be about 1.0 wt. % based on the weight of the glass filament. Glass fibers in the form of chopped strands may have a length of about 0.3 millimeter to about 10 centimeters, preferably about 0.5 millimeter to about 5 centimeters, and more preferably about 1.0 millimeter to about 2.5 centimeters.

In an embodiment, bonding glass fibers can outperform non-bonding glass fibers especially with respect to tensile strength, while modulus is also higher, without a significant drop in impact. Bonding glass fibers have a sizing onto the surface of the glass fibers to allow good coupling of the fibers to the polycarbonate matrix, and as such improve properties such as strength and stiffness. For instance, this can be achieved with a silane coating, which chemically bonds with the resin. As such, bonding glass types can be used to achieve the right combination of low smoke density and good mechanical properties.

In general, the glass fibers are present in the polycarbonate composition in an amount of about 10 to about 50 wt. %, preferably about 10 to about 40 wt. %, and more preferably about 15 to about 30 wt. %, based on the total weight of the polycarbonate composition.

The addition of relatively small amount of PC-siloxane, polydialkylsiloxane or silicone graft copolymer, or a combination thereof, to the above described glass-filled polycarbonate polymers reduces the smoke density DS-4 values significantly. Similar improvements in DS-4 values can be achieved at the same siloxane content irrespective of the architecture of the siloxane containing polymer. Further, the length of the siloxane block does not have a significant influence on the smoke density when compared at the same siloxane content in the polycarbonate composition. In an embodiment, the siloxane containing polymer is present in an amount effective to provide 0.3 to 3.00 wt. % of siloxane units based on the total weight of the polycarbonate composition.

In an embodiment, the low smoke polycarbonate compositions do not contain or substantially free of any brominated polycarbonate. As used herein, "substantially free of" refers to a composition containing less than 5 wt. %, preferably less than 1 wt. %, more preferably less than 0.1 wt. % of a brominated polycarbonate.

The polycarbonate compositions can include various other polymers to adjust the properties of the polycarbonate compositions, with the proviso that the other polymers are selected so as to not adversely affect the desired properties of the polycarbonate composition significantly, in particular low smoke density and low heat release. Other polymers include an impact modifier such as natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR) silicone elastomers, and elastomer-modified graft copolymers such as styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), high rubber graft (HRG), and the like can be present. In general such other polymers provide less than 50 wt. %, less than 40 wt. %, less than 30 wt. %, less than 20 wt. %, or less than 10 wt. % of the total composition. In an embodiment, no other polymers are present. In a preferred embodiment, no polymers containing halogen are present in the polycarbonate compositions.

The polycarbonate compositions can include various additives ordinarily incorporated into flame retardant compositions having low smoke density and low heat release, with the proviso that the additive(s) are selected so as to not adversely affect the desired properties of the polycarbonate composition significantly, in particular low smoke density and low heat release. Such additives can be mixed at a suitable time during the mixing of the components for forming the composition. Exemplary additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, light diffuser additives, radiation stabilizers, additional flame retardants, and anti-drip agents. A combination of additives can be used. In general, the additives are used in the amounts generally known to be effective. The total amount of additives (other than any filler or reinforcing agents) is generally 0.01 to 25 parts per hundred parts by the total weight of the polymers in the composition (phr).

Examples of inorganic pigments are white pigments such as titanium dioxide in its three modifications of rutile, anatase or brookite, lead white, zinc white, zinc sulfide or lithopones; black pigments such as carbon black, black iron oxide, iron manganese black or spinel black; chromatic pigments such as chromium oxide, chromium oxide hydrate green, cobalt green or ultramarine green, cobalt blue, iron blue, Milori blue, ultramarine blue or manganese blue, ultramarine violet or cobalt and manganese violet, red iron oxide, cadmium sulfoselenide, molybdate red or ultramarine red; brown iron oxide, mixed brown, spinel phases and corundum phases or chromium orange; yellow iron oxide, nickel titanium yellow, chromium titanium yellow, cadmium sulfide, cadmium zinc sulfide, chromium yellow, zinc yellow, alkaline earth metal chromates, Naples yellow; bismuth vanadate, and effect pigments such as interference pigments and luster pigments. Other preferred inorganic pigments include Pigment White 6, Pigment White 7, Pigment Black 7, Pigment Black 11, Pigment Black 22, Pigment Black 27/30, Pigment Yellow 34, Pigment Yellow 35/37, Pigment Yellow 42, Pigment Yellow 53, Pigment Brown 24, Pigment Yellow 119, Pigment Yellow 184, Pigment Orange 20, Pigment Orange 75, Pigment Brown 6, Pigment Brown 29, Pigment Brown 31, Pigment Yellow 164, Pigment Red 101, Pigment Red 104, Pigment Red 108, Pigment Red 265, Pigment Violet 15, Pigment Blue 28/36, Pigment Blue 29, Pigment Green 17, and Pigment Green 26/50. A combination comprising at least one of the foregoing pigments can be used.

Exemplary dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes can be used in amounts of 0.001 to 5 PHR.

The use of pigments such as titanium dioxide produces white compositions, which are commercially desirable. It has surprisingly been found that the use of titanium dioxide can further improve smoke density and/or heat release properties. Pigments such as titanium dioxide (or other mineral fillers) can be present in the polycarbonate compositions in amounts of 0 to 12 wt. %, 0.1 to 12 wt. %, 0.1 to 9 wt. %, 0.5 to 5 wt. %, or 0.5 to 3 wt. %, each based on the total weight of the composition.

Exemplary antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 PHR.

Exemplary heat stabilizer additives include organophosphites such as triphenyl phosphite, tris-(2,6-dimethylphenyl) phosphite, and tris-(mixed mono- and di-nonylphenyl)phosphite; phosphonates such as dimethylbenzene phosphonate, phosphates such as trimethyl phosphate; or combinations comprising at least one of the foregoing heat stabilizers. Heat stabilizers are used in amounts of 0.01 to 0.1 PHR.

Light stabilizers and/or ultraviolet light (UV) absorbing additives can also be used. Exemplary light stabilizer additives include benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or combinations comprising at least one of the foregoing light stabilizers. Light stabilizers are used in amounts of 0.01 to 5 PHR.

Exemplary UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3,3-diphenylacryloyl)oxy]methyl] propane (UVINUL® 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers, or combinations comprising at least one of the foregoing UV absorbers. UV absorbers are used in amounts of 0.01 to 5 PHR.

Plasticizers, lubricants, and/or mold release agents can also be used. There is considerable overlap among these types of materials, which include phthalic acid esters such as dioctyl-4,5-epoxy-hexahydrophthalate; tris-(octoxycarbonylethyl)isocyanurate; tristearin; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a solvent; waxes such as beeswax, montan wax, and paraffin wax. Such materials are used in amounts of 0.1 to 1 PHR.

Flame retardant salts are not needed to obtain the desired low smoke and low heat release properties, but can be added to improve other flame retardant properties. Examples of flame retardant salts include of $C_{1-16}$ alkyl sulfonate salts such as potassium perfluorobutane sulfonate (Rimar salt), potassium perfluorooctane sulfonate, tetraethylammonium perfluorohexane sulfonate, and potassium diphenylsulfone sulfonate (KSS); salts such as $Na_2CO_3$, $K_2CO_3$, $MgCO_3$, $CaCO_3$, and $BaCO_3$, phosphate salts, or fluoro-anion complexes such as $Li_3AlF_6$, $BaSiF_6$, $KBF_4$, $K_3AlF_6$, $KAlF_4$, $K_2SiF_6$, and/or $Na_3AlF_6$. In an embodiment, no flame retardant salts are present. When present, flame retardant salts are present in amounts of 0.01 to 10 PHR, more preferably 0.02 to 1 PHR.

Organic flame retardants can be present, for example organic compounds that include phosphorus, nitrogen, bromine, and/or chlorine. However, halogenated flame retardants are generally avoided, such that the polycarbonate composition can be essentially free of chlorine and bromine. "Essentially free of chlorine and bromine" as used herein means having a bromine and/or chlorine content of less than or equal to 100 parts per million by weight (ppm), less than or equal to 75 ppm, or less than or equal to 50 ppm, based on the total parts by weight of the composition, excluding any filler.

The polycarbonate compositions can further comprise an organophosphorus flame retardant in an amount effective to provide 0.1 to 2.0 wt. % phosphorus, based on the weight of the composition. For example, the organophosphorus compound, preferably BPADP or RDP can be present in an amount of 2 to 20 wt. %, which is effective to provide 0.1 to 2.0 wt. % of phosphorus based on the total weight of the composition. Inventors have found that certain organophosphorus flame retardants for example BPADP can be added to the composition without compromising smoke density or heat release, for instance to significantly improve the melt flow of the compositions Organophosphorus compounds include aromatic organophosphorus compounds having at least one organic aromatic group and at least one phosphorus-containing group, as well as organic compounds having at least one phosphorus-nitrogen bond.

In the aromatic organophosphorus compounds that have at least one organic aromatic group, the aromatic group can be a substituted or unsubstituted $C_{3-30}$ group containing one or more of a monocyclic or polycyclic aromatic moiety (which can optionally contain with up to three heteroatoms (N, O, P, S, or Si)) and optionally further containing one or more nonaromatic moieties, for example alkyl, alkenyl, alkynyl, or cycloalkyl. The aromatic moiety of the aromatic group can be directly bonded to the phosphorus-containing group, or bonded via another moiety, for example an alkylene group. The aromatic moiety of the aromatic group can be directly bonded to the phosphorus-containing group, or bonded via another moiety, for example an alkylene group. In an embodiment the aromatic group is the same as an aromatic group of the polycarbonate backbone, such as a bisphenol group (e.g., bisphenol A), a monoarylene group (e.g., a 1,3-phenylene or a 1,4-phenylene), or a combination comprising at least one of the foregoing.

The phosphorus-containing group can be a phosphate $(P(=O)(OR)_3)$, phosphite $(P(OR)_3)$, phosphonate $(RP(=O)(OR)_2)$, phosphinate $(R_2P(=O)(OR))$, phosphine oxide $(R_3P(=O))$, or phosphine $(R_3P)$, wherein each R in the foregoing phosphorus-containing groups can be the same or different, provided that at least one R is an aromatic group. A combination of different phosphorus-containing groups can be used. The aromatic group can be directly or indirectly bonded to the phosphorus, or to an oxygen of the phosphorus-containing group (i.e., an ester).

In an embodiment the aromatic organophosphorus compound is a monomeric phosphate. Representative monomeric aromatic phosphates are of the formula $(GO)_3P=O$, wherein each G is independently an alkyl, cycloalkyl, aryl, alkylarylene, or arylalkylene group having up to 30 carbon atoms, provided that at least one G is an aromatic group. Two of the G groups can be joined together to provide a cyclic group. In some embodiments G corresponds to a monomer used to form the polycarbonate, e.g., resorcinol. Exemplary phosphates include phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, and the like. A preferred aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of formula (14)

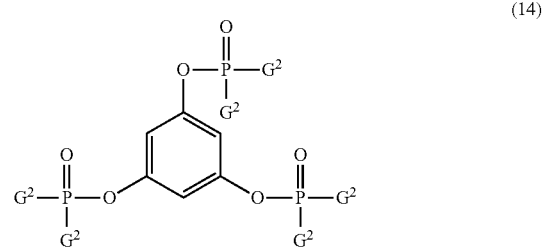

(14)

wherein each $G^2$ is independently a hydrocarbon or hydrocarbonoxy having 1 to 30 carbon atoms. In some embodiments G corresponds to a monomer used to form the polycarbonate, e.g., resorcinol.

Preferred aromatic organophosphorus compounds have two or more phosphorus-containing groups, and are inclusive of acid esters of formula (15)

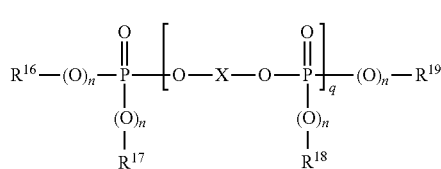

(15)

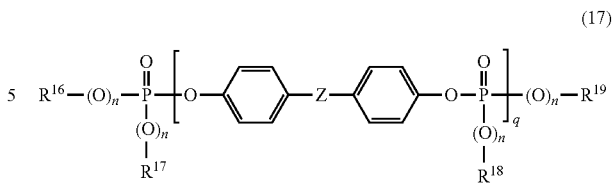

(17)

wherein $R^{16}$, $R^{17}$, $R^{18}$, and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, preferably by $C_{1-4}$ alkyl and X is a mono- or poly-nuclear aromatic $C_{6-30}$ moiety or a linear or branched $C_{2-30}$ aliphatic radical, which can be OH-substituted and can contain up to 8 ether bonds, provided that at least one of $R^{16}$, $R^{17}$, $R^{18}$, $R^{19}$ and X is an aromatic group. In some embodiments $R^{16}$, $R^{17}$, $R^{18}$, and $R^{19}$ are each independently $C_{1-4}$ alkyl, naphthyl, phenyl($C_{1-4}$ alkylene, or aryl groups optionally substituted by $C_{1-4}$ alkyl. Preferred aryl moieties are cresyl, phenyl, xylenyl, propylphenyl, or butylphenyl. In some embodiments X in formula (15) is a mono- or poly-nuclear aromatic $C_{6-30}$ moiety derived from a diphenol. Further in formula (15), n is each independently 0 or 1; in some embodiments n is equal to 1. Also in formula (15), q is from 0.5 to 30, from 0.8 to 15, from 1 to 5, or from 1 to 2. Preferably, X can be represented by the following divalent groups (16), or a combination comprising one or more of these divalent groups.

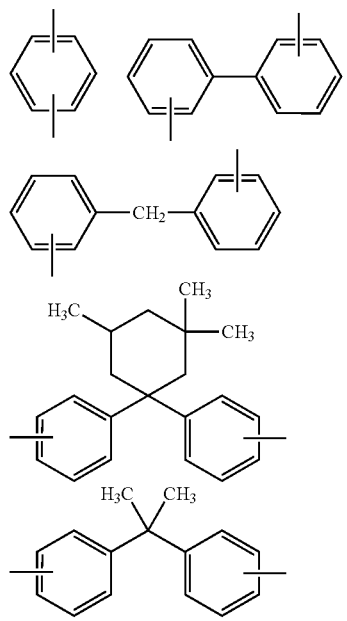

(16)

In these embodiments, each of $R^{16}$, $R^{17}$, $R^{18}$, and $R^{19}$ can be aromatic, i.e., phenyl, n is 1, and p is 1-5, preferably 1-2. In some embodiments at least one of $R^{16}$, $R^{17}$, $R^{18}$, $R^{19}$, and X corresponds to a monomer used to form the polycarbonate, e.g., bisphenol A or resorcinol. In another embodiment, X is derived especially from resorcinol, hydroquinone, bisphenol A, or diphenylphenol, and $R^{16}$, $R^{17}$, $R^{18}$, $R^{19}$, is aromatic, preferably phenyl. A preferred aromatic organophosphorus compound of this type is resorcinol bis(diphenyl phosphate), also known as RDP. Another preferred class of aromatic organophosphorus compounds having two or more phosphorus-containing groups are compounds of formula (17)

wherein $R^{16}$, $R^{17}$, $R^{18}$, $R^{19}$, n, and q are as defined for formula (19) and wherein Z is $C_{1-7}$ alkylidene, $C_{1-7}$ alkylene, $C_{5-12}$ cycloalkylidene, —O—, —S—, —SO$_2$—, or —CO—, preferably isopropylidene. A preferred aromatic organophosphorus compound of this type is bisphenol A bis(diphenyl phosphate), also known as BPADP, wherein $R^{16}$, $R^{17}$, $R^{18}$, and $R^{19}$ are each phenyl, each n is 1, and q is from 1 to 5, from 1 to 2, or 1.

Organophosphorus compounds containing at least one phosphorus-nitrogen bond includes phosphazenes, phosphorus ester amides, phosphoric acid amides, phosphonic acid amides, phosphinic acid amides, and tris(aziridinyl) phosphine oxide. Phosphazenes (18) and cyclic phosphazenes (19)

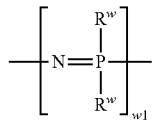

(18)

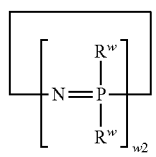

(19)

in particular can used, wherein w1 is 3 to 10,000 and w2 is 3 to 25, preferably 3 to 7, and each $R^w$ is independently a $C_{1-12}$ alkyl, alkenyl, alkoxy, aryl, aryloxy, or polyoxyalkylene group. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcook, "Phosphorus-Nitrogen Compounds" Academic Press (1972), and J. E. Mark et al., "Inorganic Polymers" Prentice-Hall International, Inc. (1992).

Accordingly, depending on the particular organophosphorus compound used, the polycarbonate compositions can comprise from 0.3 to 20 wt. %, or 0.5 to 15 wt. %, or 3.5 to 12 wt. % of the organophosphorus flame retardant, each based on the total weight of the composition. Preferably, the organophosphorus compounds can be bisphenol A bis(diphenyl phosphate), triphenyl phosphate, resorcinol bis(diphenyl phosphate), tricresyl phosphate, or a combination comprising at least one of the foregoing.

Anti-drip agents in most embodiments are not used in the polycarbonate compositions. Anti-drip agents include a fibril-forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. Antidrip agents are substantially absent or completely absent from the polycarbonate compositions in some embodiments.

Methods for forming the polycarbonate compositions can vary. In an embodiment, the polymers are combined (e.g., blended) with any additives (e.g., a mold release agent) such as in a screw-type extruder. The polymers any additives can be combined in any order, and in form, for example, powder, granular, filamentous, as a masterbatch, and the like. The polycarbonate compositions can be foamed, extruded into a sheet, or optionally pelletized. Methods of foaming a polycarbonate composition using frothing or physical or chemical blowing agents are known and can be used. The pellets can be used for molding into articles, foaming, or they can be used in forming a sheet of the flame retardant polycarbonate composition. In some embodiments, the composition can be extruded (or co-extruded with a coating or other layer) in the form of a sheet and/or can be processed through calendaring rolls to form the desired sheet.

As discussed above, the polycarbonate compositions are formulated to meet strict low smoke density requirements. The relative amounts of polycarbonate polymer and the second polymer in the polycarbonate compositions depend on the particular polycarbonate polymer and the second polymer used, the targeted level of smoke density, vertical burn, and other desired properties of the polycarbonate composition, such as stiffness, strength, impact strength, and flow. In an embodiment, the second polymer is present in an amount effective to provide 0.3 to 3 wt. % of siloxane units based on the total weight of the polycarbonate composition, and within this range the preferred amount is selected to be effective to provide an ASTM E662 smoke test Ds-1.5 value of less than 100 and DS-4 value of less than 200 when measured at a thickness of 3 mm, a flame time of less than 15 seconds, a burn length of less than 152 mm, and a drip extinguishing time of less than 5 seconds, each measured using the method of FAR F25.5, in accordance with FAR 25.853(a) at a thickness of 3 mm.

Use of a PC-siloxane, a polydialkylsiloxane, a polyorganosiloxane-containing graft copolymer or a combination thereof, together with glass fiber and a polycarbonate, selected from a linear polycarbonate homopolymer, a poly(aliphatic ester-carbonate), or a combination comprising at least one of the foregoing can lower smoke density (Ds-1.5 and Ds-4) of polycarbonate composition to the desired levels. For example, polycarbonate polymers such as linear bisphenol A polycarbonate homopolymer, or poly(aliphatic ester-carbonate) have limited inherent smoke properties. However, a combination of these polycarbonate polymers with glass fiber and a siloxane containing polymer such as (bisphenol A carbonate)-co-(polydimethylsiloxane), polydialkylsiloxane, polyorganosiloxane-containing graft copolymer, or a combination thereof has positive effect on the smoke density (Ds-1.5 and Ds-4) measured according to ASTM E662 on a 3 mm thick plaque, such that these compositions have Ds-1.5 values of less than 100 and Ds-4 values of less than 200, measured according to ASTM E662 on a 3 min thick plaque, which makes these compositions suitable for making aircraft interior parts requiring meeting FST (flame, smoke, and toxicity) requirements of FAR 25.853, provided that the other required properties meet the selection criteria as well.

The polycarbonate compositions can be formulated to have lower densities, in particular a density of 1.66 g/cc or less, 1.60 g/cc or less, 1.55 g/cc or less, 1.50 g/cc or less, 1.45 g/cc or less, 1.40 g/cc or less, 1.35 g/cc or less, 1.30 g/cc or less, or 1.25 g/cc or less, as measured according to ISO 1183. The same or similar values can be obtained in components having a wide range of thicknesses, for example from 0.1 to 10 mm, or 0.5 to 5 mm.

The polycarbonate compositions can further have good melt viscosities, which aid processing. The polycarbonate compositions can have a melt volume flow rate (MVR, cubic centimeter per 10 minutes (cc/10 min) of 3 to about 25, greater than or equal to 5, greater than or equal to 7, greater than or equal to 9, greater than or equal to 11, greater than or equal to 13, greater than or equal to 15, greater than or equal to 17, or greater than or equal to 20 cc/min, measured at 300° C./1.2 Kg at 360 second dwell according to ISO 1133. The same or similar values can be obtained in articles having a wide range of thicknesses, for example from 0.1 to 10 mm, or 0.5 to 5 mm.

The polycarbonate compositions can further have excellent impact properties, in particular Izod notched impact (INI). The compositions can have an INI energy greater than or equal to 6 kJ/m$^2$, greater than or equal to 8 kJ/m$^2$, greater than or equal to 10 kJ/m$^2$, greater than or equal to 12 kJ/m$^2$, greater than or equal to 14 kJ/m$^2$, greater than or equal to 16 kJ/m$^2$, measured at 23° C. at an impact energy of 5.5 J according to ISO 180 on an Izod impact bar with a thickness of 4 mm. These values can be obtained in articles having a wide range of thicknesses, for example from 0.1 to 10 mm, or 0.5 to 5 mm. In some embodiments, the composition can have an INI energy equal to or higher than 8 kJ/m$^2$ at lower temperatures such as 10° C., 0° C., −10° C., −20° C. and −30° C.

The polycarbonate compositions can further have excellent strength, in particular tensile or flexural strength. The compositions can have a tensile strength greater than or equal to 50 MPa, greater than or equal to 60 MPa, greater than or equal to 70 MPa, greater than or equal to 80 MPa, greater than or equal to 90 MPa, greater than or equal to 100 MPa, greater than or equal to 110 MPa, greater than or equal to 120 MPa, measured at 23° C. at a speed of 5 mm/min according to ISO 527 on a multi-purpose ISO 527 tensile bar. These values can be obtained in articles having a wide range of thicknesses, for example from 0.1 to 10 mm, or 0.5 to 5 mm. The compositions can further have a flexural strength greater than or equal to 80 MPa, greater than or equal to 90 MPa, greater than or equal to 100 MPa, greater than or equal to 110 MPa, greater than or equal to 120 MPa, greater than or equal to 130 MPa, greater than or equal to 140 MPa, greater than or equal to 150 MPa, greater than or equal to 160 MPa, measured at 23° C. at a speed of 2 mm/min according to ISO 178 on a Izod impact bar with a thickness of 4 mm.

The polycarbonate compositions can further have excellent stiffness, in particular tensile or flexural modulus. The compositions can have a tensile modulus greater than or equal to 3400 MPa, greater than or equal to 4000 MPa, greater than or equal to 6000 MPa, greater than or equal to 8000 MPa, greater than or equal to 10000 MPa, greater than or equal to 12000 MPa, greater than or equal to 14000 MPa, measured at 23° C. at a speed of 1 mm/min according to ISO 527 on a multi-purpose ISO 527 tensile bar. These values can be obtained in articles having a wide range of thicknesses, for example from 0.1 to 10 mm, or 0.5 to 5 mm. The compositions can have a flexural modulus greater than or equal to 3200 MPa, greater than or equal to 4000 MPa, greater than or equal to 6000 MPa, greater than or equal to 8000 MPa, greater than or equal to 10000 MPa, greater than or equal to 12000 MPa, measured at 23° C. at a speed of 2 mm/min according to ISO 178 on a Izod impact bar with a thickness of 4 mm.

As mentioned throughout, the polycarbonate composition can be used in a wide variety of applications, particularly those requiring low smoke values. Articles comprising the polycarbonate compositions can be manufactured by foaming, molding, thermoforming, extruding, or casting the polycarbonate copolymer compositions. Thus the polycarbonate composition can be used to form a foamed article, a molded article, a thermoformed article, an extruded film, an extruded sheet, one or more layers of a multi-layer article, a substrate for a coated article, or a substrate for a metallized article.

The polycarbonate composition is particularly useful in aircraft, specifically a variety of aircraft compartment interior applications. The articles manufactured from the compositions described herein can thus be an aircraft component. In a specific embodiment the articles are interior components for aircraft, including profiles, panels, panel inserts, air flow regulators, call buttons, oxygen system housings, oxygen system covers, window frames, window housings, lighting rails, grip rails, passenger service unit components, luggage bin components, profiles, washing tables, side wall components, food trays, in-flight entertainment housings, display bezel, crew communication device components, seat components, side-arm panels, literature pockets, tray tables, monitor covers, kick panels, tray table arms, foot rests, seat arms, headrests, electronic housings, air ducting components, grills, panel fixations, cable brackets, door handles, hinges, trolley components, and connectors. The polycarbonate compositions can be formed (e.g., molded) into sheets that can be used for any of the above mentioned components. It is generally noted that the overall size, shape, thickness, and the like of the polycarbonate sheet can vary depending upon the desired application.

In an embodiment, an aircraft component, wherein the component is a molded or extruded interior aircraft component comprising a polycarbonate composition comprises: a first polycarbonate selected from a polycarbonate homopolymer, a poly(aliphatic ester-carbonate), or a combination comprising at least one of the foregoing; a second polymer different from the first polycarbonate, the second polymer comprising a poly(carbonate-siloxane) copolymer, a polydialkylsiloxane, a silicone graft copolymer, or a combination comprising at least one of the foregoing, wherein siloxane units in the second polymer are present in the polycarbonate composition in an amount of 0.3 to 3 wt. %, based on the total weight of the polycarbonate composition; and 10 to 50 wt. % of glass fiber, based on the total weight of the polycarbonate composition; wherein a sample of the polycarbonate composition has: an ASTM E662 smoke test Ds-1.5 value of less than 100 and DS-4 value of less than 200 when measured at a thickness of 3 mm, a flame time of less than 15 seconds, a burn length of less than 152 mm, and a drip extinguishing time of less than 5 seconds, each measured using the method of FAR F25.5, in accordance with FAR 25.853(a) at a thickness of 3 mm.

The first polycarbonate can comprise linear polycarbonate homopolymer. One or more of the following conditions can apply: the linear polycarbonate homopolymer comprises repeating units of the formula

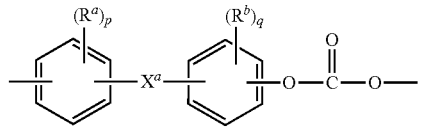

wherein $R^a$ and $R^b$ are each independently a $C_{1-12}$ alkyl group, $C_{1-12}$ alkenyl, $C_{3-8}$ cycloalkyl, or $C_{1-12}$ alkoxy, p and q are each independently integers of 0 to 4, and $X^a$ is a single bond, —O—, —S—, —S(O)—, —S(O)_2—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; the linear polycarbonate homopolymer comprises bisphenol A carbonate units; or the linear polycarbonate has an average molecular weight of 18,000 to 25,000 g/mol, wherein the composition has a melt volume flow rate of about 8 to about 25 cc/10 min, measured at 300° C./1.2 Kg at 360 second dwell according to ISO 1133.

Alternatively, the first polycarbonate comprises a poly(aliphatic ester-carbonate). The poly(aliphatic ester-carbonate) comprises bisphenol A sebacate ester units and bisphenol A carbonate units in a molar ratio of 2:98 to 8:92.

In an embodiment, the second polymer comprises a poly(carbonate-siloxane) copolymer. One or more of the following conditions can apply: the poly(carbonate-siloxane) copolymer comprises first repeating units and second repeating units, wherein the first repeating units are bisphenol carbonate units of the formula

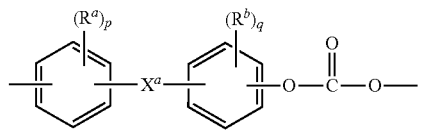

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)_2—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; and the second repeating units are polysiloxane units of the formula

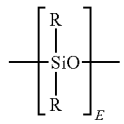

wherein R is each independently a $C_{1-13}$ monovalent hydrocarbon group, and E has an average value of 2 to 200; the second repeating units are siloxane units of the formulas

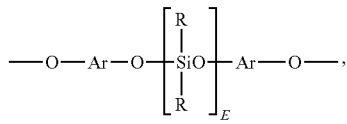

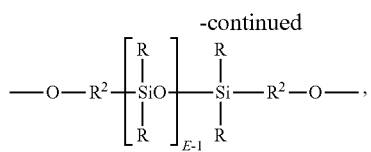

or a combination comprising at least one of the foregoing, wherein R is each independently a $C_{1-13}$ monovalent hydrocarbon group, Ar is each independently a $C_{6-30}$ aromatic group, $R^2$ is each independently a $C_{2-8}$ alkylene group, and E has an average value of 2 to 200; the siloxane units are of the formula

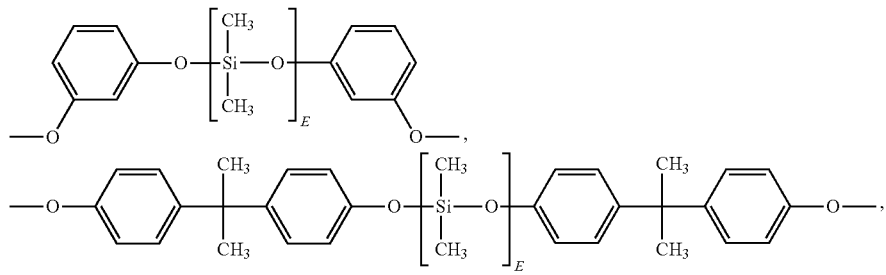

or a combination comprising at least one of the foregoing, wherein E has an average value of 2 to 200; the siloxane units are of the formula

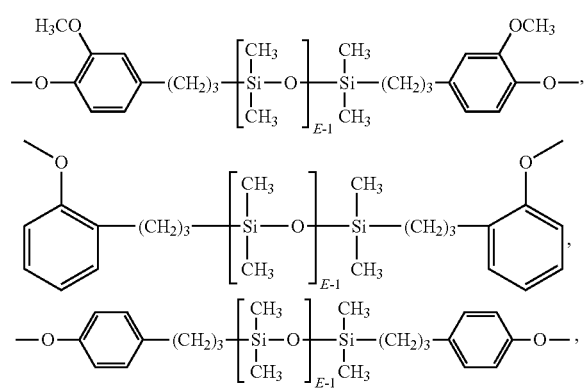

wherein R is each independently a $C_{1-13}$ monovalent hydrocarbon group, $R^3$ is independently a divalent $C_{2-8}$ aliphatic group, M is each independently a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, or a combination comprising at least one of the foregoing, n is each independently 0, 1, 2, 3, or 4, and E has an average value of 2 to 200; the siloxane units are siloxane units of the formula or a combination comprising at least one of the foregoing, wherein E has an average value of 2 to 200; E has an average value of 5 to 120; or the second polymer is present in an amount effective to provide 0.3 wt. % to 3.0 wt. % siloxane based on the total weight of the polycarbonate composition.

In another embodiment, the second polymer comprises polydialkylsiloxane. One of more of the following can apply: the polydialkylsiloxane hays a viscosity from 10 to 100,000,000 mPa-s at 25° C., wherein the alkyl groups each independently comprises 1 to 10 carbon atoms; or the polydialkylsiloxane is a polydimethylsiloxane having a viscosity from 50 to 1,000 mPa-s at 25° C.

In yet another embodiment, the second polymer comprises a silicone graft copolymer comprising a core comprising a polydiorganosiloxane and a vinyl-based monomer graft copolymerized with the core to form a shell.

For the foregoing embodiments, one or more of the following conditions can apply: glass fiber has a length of about 1 to about 10 millimeters and a diameter of about 5 to about 20 micrometers; or glass fiber is bonding glass fiber that bounds with a polycarbonate, a polyphenylene ether or a polyamide.

When the glass fiber is present in an amount of 10 to 20 wt. %, based on the total weight of the composition, the aircraft component has: a tensile modulus of equal to or higher than 3400 MPa, measured according to ISO 527 at 5 mm/min and at 23° C., a tensile strength of equal to or higher than 50 MPa measured according to ISO 527 at 5 mm/min and at 23° C., an IZOD notched impact of equal to or higher than 5 kJ/m² measured according to ISO 180 at 5.5 J and at 23° C. on a 3 mm thick sample, and a density of equal to or lower than 1.36 g/cm³ measured according to ISO 1183.

When the glass fiber is present in an amount of 20 to 30 wt. %, based on the total weight of the composition, the aircraft component has: a tensile modulus of equal to or higher than 5000 MPa, measured according to ISO 527 at 5 mm/min and at 23° C., a tensile strength of equal to or higher than 70 MPa measured according to ISO 527 at 5 mm/min and at 23° C., an IZOD notched impact of equal to or higher than 5 kJ/m² measured according to ISO 180 at 5.5 J and at 23° C. on a 3 mm thick sample, and a density of equal to or lower than 1.45 g/cm³ measured according to ISO 1183.

When the glass fiber is present in an amount of 30 to 40 wt. %, based on the total weight of the composition, the aircraft component has: a tensile modulus of equal to or higher than 7500 MPa, measured according to ISO 527 at 5 mm/min and at 23° C., a tensile strength of equal to or higher than 85 MPa measured according to ISO 527 at 5 mm/min and at 23° C., an IZOD notched impact of equal to or higher than 6 kJ/m² measured according to ISO 180 at 5.5 J and at 23° C. on a 3 mm thick sample, and a density of equal to or lower than 1.55 g/cm³ measured according to ISO 1183.

When the glass fiber is present in an amount of 40 to 50 wt. %, based on the total weight of the composition, the component has: a tensile modulus of equal to or higher than 9500 MPa, measured according to ISO 527 at 5 mm/min and at 23° C., a tensile strength of equal to or higher than 90 MPa measured according to ISO 527 at 5 mm/min and at 23° C., an IZOD notched impact of equal to or higher than 7 kJ/m2 measured according to ISO 180 at 5.5 J and at 23° C. on a 3 min thick sample, and a density of equal to or lower than 1.66 g/cm3 measured according to ISO 1183.

In specific exemplary embodiments, the polycarbonate composition comprises, based on the weight of the composition, 25 to 90 wt. % of a linear bisphenol A polycarbonate homopolymer; a poly(carbonate-siloxane), present in an amount wherein siloxane units in the second polymer are present in the polycarbonate composition in an amount of 0.3 to 3 wt. %, based on the total weight of the polymer composition; and comprising bisphenol A carbonate units, and siloxane units of the formula

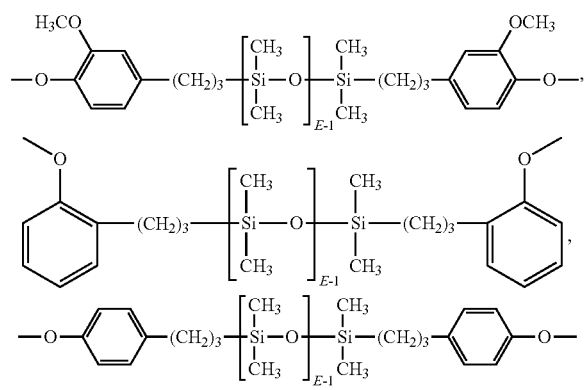

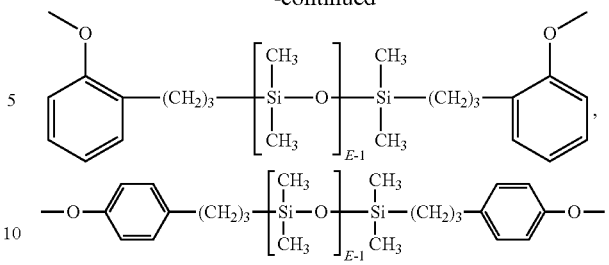

or a combination comprising at least one of the foregoing, wherein E has an average value of 2 to 200; wherein the poly(carbonate-siloxane) comprises 0.5 to 55 wt. % of siloxane units based on the total weight of the poly(carbonate-siloxane); and 10 wt. % to 50 wt. % of glass fiber; wherein a sample of the polycarbonate composition has an ASTM E662 smoke test Ds-1.5 value of less than 100 and DS-4 value of less than 200 when measured at a thickness of 3 mm, a flame time of less than 15 seconds, a burn length of less than 152 mm, and a drip extinguishing time of less than 5 seconds, each measured using the method of FAR F25.5, in accordance with FAR 25.853(a) at a thickness of 3 mm.

In another specific exemplary embodiment, the polycarbonate composition comprises, based on the weight of the composition, 32.5 to 90 wt. % of a linear bisphenol A polycarbonate homopolymer having a molecular weight of about 17,000 g/mol to about 23,000 g/mol as determined by gel permeation chromatography using polycarbonate standards; a poly(carbonate-siloxane) present in an amount wherein siloxane units in the second polymer are present in the polycarbonate composition in an amount of 0.3 to 3 wt. %, based on the total weight of the polymer composition; comprising bisphenol A carbonate units, and siloxane units of the formula

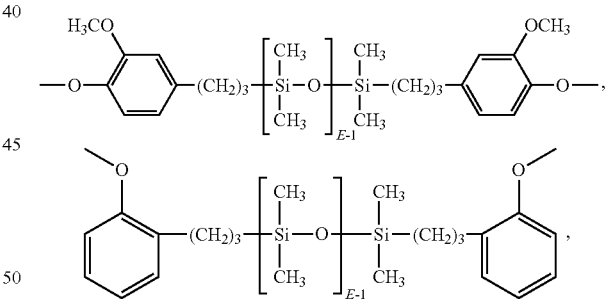

or a combination comprising at least one of the foregoing, wherein E has an average value of 2 to 200; wherein the poly(carbonate-siloxane) comprises 0.5 to 55 wt. % of siloxane units based on the total weight of the poly(carbonate-siloxane); and 10 to 35 wt. % of glass fiber; and 0 to 5 wt. % of titanium dioxide; wherein a sample of the polycarbonate composition has an ASTM E662 smoke test Ds-1.5 value of less than 100 and DS-4 value of less than 200 when measured at a thickness of 3 mm, a flame time of less than 15 seconds, a burn length of less than 152 mm, and a drip extinguishing time of less than 5 seconds, each measured using the method of FAR F25.5, in accordance with FAR 25.853(a) at a thickness of 3 mm.

Alternatively, the polycarbonate composition comprises, based on the weight of the composition, 32.5 to 90 wt. % of For the foregoing aircraft components, the polycarbonate composition can comprises, based on the weight of the composition, 25 to 90 wt. % of a poly(aliphatic ester-carbonate) comprising bisphenol A sebacate ester units and bisphenol A carbonate units in a molar ratio of 2:98 to 8:92; and a poly(carbonate-siloxane), present in an amount wherein siloxane units in the second polymer are present in the polycarbonate composition in an amount of 0.3 to 3 wt. %, based on the total weight of the polymer composition; comprising bisphenol A carbonate units, and siloxane units of the formula

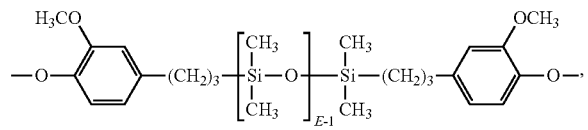

a linear bisphenol A polycarbonate homopolymer having a molecular weight of about 25,000 g/mol to about 35,000 g/mol as determined by gel permeation chromatography using polycarbonate standards; a poly(carbonate-siloxane) present in an amount wherein siloxane units in the second polymer are present in the polycarbonate composition in an amount of 0.3 to 3 wt. %, based on the total weight of the polymer composition; comprising bisphenol A carbonate units, and siloxane units of the formula

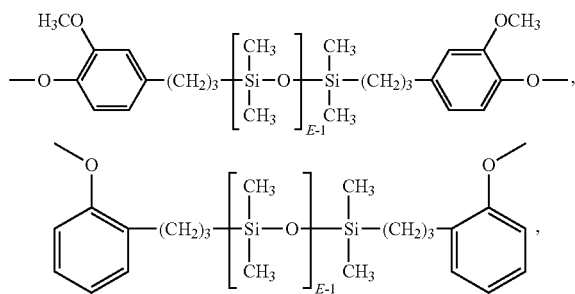

or a combination comprising at least one of the foregoing, wherein E has an average value of 2 to 200; wherein the poly(carbonate-siloxane) comprises 0.5 to 55 wt. % of siloxane units based on the total weight of the poly(carbonate-siloxane); and 10 to 35 wt. % of glass fiber; and 0.5 to 5 wt. % of titanium dioxide; wherein a sample of the polycarbonate composition has an ASTM E662 smoke test Ds-1.5 value of less than 100 and DS-4 value of less than 200 when measured at a thickness of 3 mm, a flame time of less than 15 seconds, a burn length of less than 152 mm, and a drip extinguishing time of less than 5 seconds, each measured using the method of FAR F25.5, in accordance with FAR 25.853(a) at a thickness of 3 mm.

In another embodiment, the polycarbonate composition comprises, based on the weight of the composition, 25 to 90 wt. % of a poly(aliphatic ester-carbonate) comprising bisphenol A sebacate ester units and bisphenol A carbonate units in a molar ratio of 2:98 to 8:92; and a poly(carbonate-siloxane) present in an amount wherein siloxane units in the second polymer are present in the polycarbonate composition in an amount of 0.3 to 3 wt. %, based on the total weight of the polymer composition; comprising bisphenol A carbonate units, and siloxane units of the formula

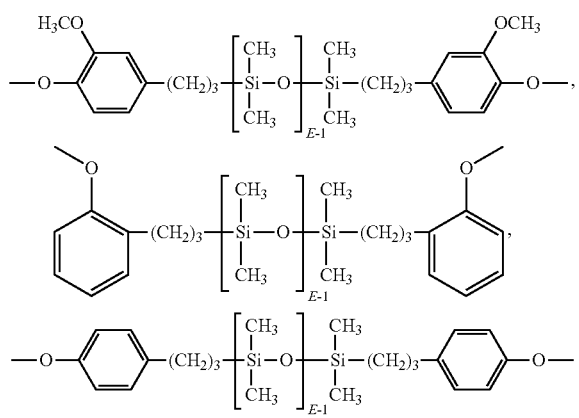

or a combination comprising at least one of the foregoing, wherein E has an average value of 2 to 200; wherein the poly(carbonate-siloxane) comprises 0.5 to 55 wt. % of siloxane units based on the total weight of the poly(carbonate-siloxane); and 10 wt. % to 35 wt. % of glass fiber; and 0.2 to 5 wt. % of titanium dioxide; wherein a sample of the polycarbonate composition has an ASTM E662 smoke test Ds-1.5 value of less than 100 and DS-4 value of less than 200 when measured at a thickness of 3 mm, a flame time of less than 15 seconds, a burn length of less than 152 mm, and a drip extinguishing time of less than 5 seconds, each measured using the method of FAR F25.5, in accordance with FAR 25.853(a) at a thickness of 3 mm.

For any one of the foregoing embodiments of the aircraft components, one or more of the following conditions can apply: the polycarbonate composition further comprises 0.2 to 10 wt. % of titanium dioxide; the polycarbonate composition further comprises an aromatic organophosphorus compound having at least one organic aromatic group and at least one phosphorus-containing group, or an organic compound having at least one phosphorus-nitrogen bond; the organophosphorus compound is bisphenol A bis(diphenyl phosphate), triphenyl phosphate, resorcinol bis(diphenyl phosphate), tricresyl phosphate, a phenol/bi-phenol polyphosphate, or a combination comprising at least one of the foregoing; the organophosphorus compound containing a nitrogen-phosphorus bond is a phosphazene, phosphorus ester amide, phosphoric acid amide, phosphonic acid amide, phosphinic acid amide, tris(aziridinyl) phosphine oxide, a combination comprising at least one of the foregoing; the organophosphorus compound is effective to provide phosphorus in an amount of 0.1% to 1.0% of phosphorus, based on the weight of the polycarbonate composition; no or substantially no brominated polycarbonate is present in the polycarbonate composition; the polycarbonate composition further comprises no more than 5 wt. % based on the weight of the composition of a processing aid, a heat stabilizer, an antioxidant, an ultra violet light absorber, a colorant, or a combination comprising at least one of the foregoing; or the component is a profile, panel, panel insert, air flow regulator, call button, oxygen system housing, oxygen system cover, window frame, window housing, lighting rail, grip rail, passenger service unit component, luggage bin component, profile, washing table, side wall component, food tray, in-flight entertainment housing, display bezel, crew communication device component, seat component, side-arm panel, literature pocket, tray table, monitor cover, kick panel, tray table arm, foot rests seat arm, headrest, electronic housing, air ducting component, grill, panel fixation, cable bracket, door handle, hinge, trolley component or connector.

The disclosure is further illustrated by the following Examples. It should be understood that the non-limiting examples are merely given for the purpose of illustration. Unless otherwise indicated, parts and percentages are by weight based upon the total weight of the polycarbonate composition.

EXAMPLES

The materials used in the Examples are described in Table 1.

TABLE 1

| Component | Chemical Description | Source |
|---|---|---|
| PC1 | Linear Bisphenol A polycarbonate, produced via interfacial polymerization, Mw of about 30,000 g/mol as determined by GPC using polycarbonate standards, phenol end-capped | SABIC |
| PC2 | Linear Bisphenol A polycarbonate, produced via interfacial polymerization, Mw of about 21,800 g/mol as determined by GPC using polycarbonate standards, phenol end-capped | SABIC |
| PC3 | Linear Bisphenol A polycarbonate, produced via interfacial polymerization, Mw of about 18,800 g/mol as determined by GPC using polycarbonate standards, para-cumylphenyl (PCP) end-capped | SABIC |
| SiPC1 | PDMS (polydimethylsiloxane) - Bisphenol A polycarbonate copolymer, produced via interfacial polymerization, 6 mol % siloxane, average PDMS block length of 45 units (D45), Mw about 23,000 g/mol as determined by GPC using polycarbonate standards, para-cumylphenol (PCP) end-capped | SABIC |
| SiPC2 | PDMS (polydimethylsiloxane) - Bisphenol A polycarbonate copolymer, produced via interfacial polymerization, 20 mol % siloxane, average PDMS block length of 45 units (D45), Mw about 30,000 g/mol as determined by GPC using polycarbonate standards, para-cumylphenol (PCP) end-capped | SABIC |
| HFD | Sebacic acid-bisphenol A polyestercarbonate, produced via interfacial polymerization, about 6.0 mol % sebacic acid, Mw about 21,400 g/mol as determined via GPC using polycarbonate standards, para-cumylphenol (PCP) end-capped | SABIC |
| PDMS | Polydimethylsiloxane (PDMS) oil, M1000 (1000 cps) | MOMENTIVE |
| MR01 | Silicone core-shell graft copolymer, KANE ACE ™ MR-01 | KANEKA |
| BPADP | Bisphenol A diphosphate | Nagase (Europe) GmbH |
| OPCTS | Octaphenylcyclotetrasiloxane | MOMENTIVE |
| PPMS | Polyphenylmethylsiloxane oil, PN200 | MOMENTIVE |
| $TiO_2$ | Coated titanium dioxide | DuPont Titanium |
| Carbon black | Amorphous Carbon | Cabot |
| IRGAFOS 168 | Tris(di-t-butylphenyl)phosphite | BASF |
| GF1 | Chopped glass (aluminum borosilicate) fiber, bonding (with sizing) for polycarbonate, fiber length of 2-5 mm, fiber diameter of 12.0-15.5 μm | Nippon Electric Glass |
| GF2 | Chopped glass (aluminum borosilicate) fiber, non-bonding (without sizing) for polycarbonate, fiber length of 2-5 mm, fiber diameter of 12.0-15.5 μm | Nippon Electric Glass |

The physical tests performed are summarized in Table 2.

TABLE 2

| Description | Test | Conditions | Specimen | Property | Units |
|---|---|---|---|---|---|
| Melt volume rate | ISO 1133 | 300° C., 1.2 kg, dwell time 300 s | Pellets | MVR | $cm^3/10\ min$ |
| Density | ISO 1183 | 23° C. | Multi-purpose ISO 3167 Type A, 4 mm thickness | Density | $g/cm^3$ |
| Izod impact | ISO 180 | Various temperatures, 5.5 J | Multi-purpose ISO 3167 Type A, 3 mm thickness | INI (notched), IUI (un-notched) | $kJ/m^2$ |
| Tensile test | ISO 527 | 23° C., 5 mm/min | Multi-purpose ISO 527 tensile bar | TS (tensile strength), TM (tensile modulus) | MPa |
| Flexural test | ISO 178 | 23° C., 2 mm/min | Multi-purpose ISO 3167 Type A, 4 mm thickness | FS (flexural strength), FM (flexural modulus) | MPa |

Blending, Extrusion, and Molding Conditions

The compositions were made as follows. All solid additives (e.g., stabilizers, colorants, solid flame retardants) were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. The glass fibers were fed using a side feeder. The liquid flame retardants (e.g., BPADP) were fed before the vacuum using a liquid injection system. It will be recognized by one skilled in the art that the method is not limited to these temperatures or processing equipment.

Extrusion of all materials was performed on a 25 mm Werner-Pfleiderer ZAK twin-screw extruder (L/D ratio of 33/1) with a vacuum port located near the die face. The extruder has 9 zones, which were set at temperatures of 40° C. (feed zone), 200° C. (zone 1), 250° C. (zone 2), 270° C.

(zone 3) and 280-300° C. (zone 4 to 8). Screw speed was 300 rpm and throughput was between 15 and 25 kg/hr. It will be recognized by one skilled in the art that the method is not limited to these temperatures or processing equipment.

The compositions were molded after drying at 120° C. for 2 hours on a 45-ton Engel molding machine with 22 mm screw or 75-ton Engel molding machine with 30 mm screw operating at a temperature 270-300° C. with a mold temperature of 70-90° C. It will be recognized by one skilled in the art that the method is not limited to these temperatures or processing equipment.

Smoke density testing (ASTM E-662-83, ASTM F-814-83, Airbus ABD0031, Boeing BSS 7239) was performed on 7.5×7.5 cm plaques of 1.5 mm thickness according to the method shown in FAR 25.853 (d), and in Appendix F, section V (FAR F25.5). Smoke density was measured under flaming mode. Smoke density (Ds) at 1.5 min and 4.0 min were reported.

Vertical Burn was performed according to FAR 25.853(a), Appendix F, Part I, (a),1,(i), on a plaque of 76×305 mm with a thickness of 1.5 or 3 mm using a vertical Bunsen burner. Test sample is placed beneath the burner for 60 seconds, after which the burner is removed and the flame time (time in seconds that the specimen continues to flame after burner flame is removed), the average drip extinguishing time (time in seconds that any flaming material continues to flame after falling from specimen) and the average burn length (distance from original specimen's edge to farthest evidence of damage to the specimen in mm) are measured.

Siloxane content is a weight percent calculated by dividing the total siloxane weight in a composition over the total weight of the polymer composition.

Examples 1-4

These examples demonstrate the effect of polydimethylsiloxane/bisphenol A polycarbonate copolymer (SiPC1) addition to compositions containing 30% glass fiber and linear bisphenol A polycarbonate (PC1) on smoke density and vertical burn. In all these examples, non-bonding glass for polycarbonate (GF2) was used. Formulations and results are shown in Table 3.

TABLE 3

| Component | Unit | CEx1 | Ex2 | Ex3 | Ex4 |
|---|---|---|---|---|---|
| PC1 | Wt % | 69.92 | 65.54 | 61.18 | 34.92 |
| Irgafos 168 | Wt % | 0.08 | 0.08 | 0.08 | 0.08 |
| SiPC1 | Wt % | — | 4.38 | 8.74 | 35 |
| GF2 | Wt % | 30 | 30 | 30 | 30 |
| SiPC1 content in polymer composition | % | 0 | 6.25 | 12.5 | 50 |
| Smoke density DS-1.5 | — | 19 | 4 | 10 | 3 |
| Smoke density DS-4 | — | 203 | 45 | 93 | 121 |
| Average After flame time | s | 2 | 1 | 2 | 6 |
| Average Burning drip time | s | 0 | 0 | 0 | 0 |
| Average Burn Length | mm | 122 | 122 | 128 | 127 |

Comparative example 1 shows that PC1 with 30% GF2 (CEx1) does not meet the requirements of ASTM E662, as it has a too high DS-4 smoke density (requirements are DS-1.5 below 100 and DS-4 below 200 according to FAR 25.853). Examples 2-4 show that the addition of SiPC1 reduces smoke density values significantly, such that ASTM E662 requirements for FAR 25.853 are met. This reduction is seen for SiPC1 contents between 6.25 and 50% based on the total polymer content in the composition. Example 2 shows that lower SiPC1 contents give lower smoke density values than higher loadings (Example 3 and 4), indicating an optimum in SiPC1 content. All examples meet the requirements for vertical burn (Flame time <15 s, Burning drip time <3 s, Burn length <152 mm) for FAR 25.853, and as such, the compositions of Examples 2-4 are compliant with smoke density and vertical burn requirements of FAR 25.853 and are suitable for applications requiring meeting FST requirements, but not OSU.

Examples 5-9

These examples show the effect of the glass fiber loading on the smoke density and vertical burn properties of compositions comprising linear bisphenol A polycarbonate (PC1) and polydimethylsiloxane/bisphenol A polycarbonate copolymer (SiPC1). In all these examples, non-bonding glass for polycarbonate was used (GF2). The SiPC1 content in the polymer composition was kept same for all examples, namely 12.5 wt % of the total polymer composition. Formulations and results are shown in Table 4.

TABLE 4

| Component | Unit | CEx5 | CEx6 | Ex7 | Ex8 | Ex9 |
|---|---|---|---|---|---|---|
| PC1 | Wt % | 87.43 | 83.05 | 78.68 | 61.18 | 52.43 |
| Irgafos 168 | Wt % | 0.08 | 0.08 | 0.08 | 0.08 | 0.08 |
| SiPC1 | Wt % | 12.49 | 11.87 | 11.24 | 8.74 | 7.49 |
| GF2 | Wt % | 0 | 5 | 10 | 30 | 40 |
| SiPC1 content in polymer composition | % | 12.5 | 12.5 | 12.5 | 12.5 | 12.5 |
| Smoke density DS-1.5 | — | NA | NA | 9 | 10 | 3 |
| Smoke density DS-4 | — | NA | NA | 91 | 93 | 53 |
| Average After flame time | s | 10 | 29 | 3 | 3 | 0 |
| Average Burning drip time | s | 6 | 2 | 0 | 0 | 0 |
| Average Burn Length | mm | 90 | 122 | 122 | 120 | 97 |

Compositions containing only PC1 and SiPC1 (CEx5) do not meet the FAR 25.853 requirements for vertical burn, as the burning drip time is too long (6 s, requirement is <3 s) and the after flame time is close to the requirement (10 s, requirement is <15 s). Addition of 5% GF2 to the composition (CEx6) does not result in meeting vertical burn requirements of FAR 25.853, due to too long after flame time (29 s, requirement is <15 s) and burning drip time close to the requirement (2 s, requirement is <3 s). The addition of at least 10% of GF2 to the composition (Examples 7-9), results in meeting all requirements for vertical burn according to FAR 25.853. Furthermore, DS-1.5 and DS4 values in ASTM E662 for Examples 7-9 are far below the requirement for FAR25.853 (DS-1.5 below 100 and DS-4 below 200). Therefore, compositions containing PC1, SiPC1 and at least 10% of GF are suitable for applications requiring meeting FST requirements, but not OSU.

Examples 10-14

These examples show the effect of the source of siloxane on the smoke density of compositions comprising linear bisphenol A polycarbonate (PC1) and 30% glass fiber. Formulations and results are shown in Table 5.

TABLE 5

| Component | Unit | Ex10 | Ex11 | Ex12 | CEx13 | Ex14 |
|---|---|---|---|---|---|---|
| PC1 | Wt % | 61.18 | 67.3 | 69.438 | | |
| PC2 | Wt % | | | | 69.04 | 69.26 |

TABLE 5-continued

| Component | Unit | Ex10 | Ex11 | Ex12 | CEx13 | Ex14 |
|---|---|---|---|---|---|---|
| Irgafos 168 | Wt % | 0.08 | 0.08 | 0.08 | 0.08 | 0.08 |
| SiPC1 | Wt % | 8.74 | | | | |
| SiPC2 | Wt % | | 2.62 | | | |
| PDMS | Wt % | | | 0.482 | | |
| MR01 | wt % | | | | | 0.66 |
| PPMS | Wt % | | | | 0.88 | |
| GF2 | Wt % | 30 | 30 | 30 | | |
| GF1 | Wt % | | | | 30 | 30 |
| Siloxane content in polymer composition | Wt % | 0.75 | 0.75 | 0.75 | | 0.75 |
| Smoke density DS-1.5 | | 10 | 5 | 4 | 18 | 10 |
| Smoke density DS-4 | — | 93 | 42 | 82 | 223 | 98 |
| Average After flame time | s | 3 | 1 | 3 | 15 | NA |
| Average Burning drip time | s | 0 | 0 | 0 | 0 | NA |
| Average Burn Length | mm | 120 | 119 | 87 | 131 | NA |

The composition containing GF, PC1 and SiPC1 in Example 10 meets the FAR 25.853 requirements for ASTM E662 (requirements are DS-1.5 below 100 and DS-4 below 200) and for vertical burn (Flame time <15 s, Burning drip time <3 s, Burn length <152 mm). Compositions containing GF2, PC1 and SiPC2 (Example 11) or PDMS (Example 12) at similar siloxane content in the total polymer composition instead of SiPC1 also meet all these requirements. Using a silicone graft copolymer (MR01), which is also based on aliphatic siloxane instead of SiPC1 (Example 14) at similar siloxane content in the total polymer composition also results in meeting the smoke density requirements, and can be used instead of SiPC1 or PDMS. An aromatic siloxane, polyphenylmethylsiloxane, on the other hand (Comparative Example 13) results in failing both ASTM E662 smoke density requirements (DS-4 of 223, above the requirement of <200) and vertical burn (after flame time of 15 s, same as the requirement of <15).

Accordingly, the results demonstrate that aliphatic siloxanes reduce smoke density, and not aromatic ones. This is contradictory to commonly applied flame retardant (FR) approaches in polycarbonate for UL performance, where typically aromatic siloxanes, such as polymethylphenylsiloxane or octaphenylcyclotretrasiloxane are used, but not aliphatic ones.

Examples 15-17

These examples show the smoke density and vertical burn properties of compositions containing polydimethylsiloxane/bisphenol A polycarbonate copolymer SiPC1, 30% glass fiber (GF1) and different types of high flow polycarbonate resins, including PC2, PC3, and HFD copolymer. Formulations and results are shown in Table 6.

TABLE 6

| Component | Unit | Ex15 | Ex16 | Ex17 |
|---|---|---|---|---|
| PC2 | Wt % | 59.35 | | |
| PC3 | Wt % | | 59.35 | |
| HFD | Wt % | | | 59.35 |
| Irgafos 168 | Wt % | 0.08 | 0.08 | 0.08 |
| TiO2 | Wt % | 2 | 2 | 2 |
| CB | Wt % | 0.1 | 0.1 | 0.1 |
| SiPC1 | Wt % | 8.47 | 8.47 | 8.47 |

TABLE 6-continued

| Component | Unit | Ex15 | Ex16 | Ex17 |
|---|---|---|---|---|
| GF1 | Wt % | 30 | 30 | 30 |
| SiPC1 content in polymer composition | % | 12.5 | 12.5 | 12.5 |
| Smoke density DS-1.5 | | 15 | 12 | 15 |
| Smoke density DS-4 | — | 104 | 108 | 104 |
| Average After flame time | s | 2 | 4 | 0 |
| Average Burning drip time | s | 0 | 0 | 0 |
| Average Burn Length | mm | 119 | 121 | 140 |
| MVR, 300, 1.2 kg | cc/10' | 12 | 15 | 18 |

Examples 15-17 show that high flow polycarbonate (PC2 or PC3) or polycarbonate copolymer with improved flow characteristics (HFD) can be used as well in compositions containing 30% GF1 and 12.5% SiPC1 based on the total polymer composition. Examples 15-17 meet the FAR 25.853 requirements for ASTM E662 (requirements are DS-1.5 below 100 and DS-4 below 200) and for vertical burn (Flame time <15 s, Burning drip time <3 s, Burn length <152 mm). Examples 15-17 all have MVR values above 10 cc/10 min measured according to standard polycarbonate conditions (300° C., 1.2 kg) according to ISO 1133, which is beneficial for injection molding of aircraft interior parts requiring meeting FST requirements of FAR 25.853, but not OSU requirements.

Examples 18-21

These examples show the effect of $TiO_2$ loading on smoke density in compositions containing polydimethylsiloxane/bisphenol A polycarbonate copolymer (SiPC1), 30% glass fiber (GF1) and polycarbonate (PC2). Results and formulations are shown in Table 7.

TABLE 7

| Component | Unit | Ex18 | Ex19 | Ex20 | Ex21 |
|---|---|---|---|---|---|
| PC2 | Wt % | 61.18 | 60.65 | 59.35 | 56.7 |
| Irgafos 168 | Wt % | 0.08 | 0.08 | 0.08 | 0.08 |
| TiO2 | Wt % | 0 | 0.5 | 2 | 5 |
| CB | Wt % | 0 | 0.1 | 0.1 | 0.1 |
| SiPC1 | Wt % | 8.74 | 8.67 | 8.47 | 8.12 |
| GF1 | Wt % | 30 | 30 | 30 | 30 |
| SiPC1 content in polymer composition | % | 12.5 | 12.5 | 12.5 | 12.5 |
| Smoke density DS-1.5 | — | 6 | 10 | 15 | 7 |
| Smoke density DS-4 | — | 80 | 83 | 104 | 77 |
| Average After flame time | s | 2 | 0 | 2 | 0 |
| Average Burning drip time | s | 0 | 0 | 0 | 0 |
| Average Burn Length | mm | 142 | 120 | 119 | 125 |

The composition without $TiO_2$ (Ex18) meet the FAR 25.853 requirements for ASTM E662 (requirements are DS-1.5 below 100 and DS-4 below 200) and for vertical burn (Flame time <15 s, Burning drip time <3 s, Burn length <152 mm). Addition of $TiO_2$ does not significantly affect ASTM E662 smoke density values (Examples 19-21), but slightly improves vertical burn properties, reducing burn length from 142 mm for Example 18 to values between 115-125 mm for Examples 19-21). As such, compositions containing $TiO_2$ are capable of meeting FST requirements of FAR 25.853, but not OSU requirements.

Examples 22-23

These examples show the effect of the addition of BPADP to a composition containing polycarbonate (PC1), polydimethylsiloxane/bisphenol A polycarbonate copolymer (SiPC1) and glass fiber (GF2). Formulations and results are shown in Table 8.

TABLE 8

| Component | Unit | Ex22 | Ex23 |
|---|---|---|---|
| PC1 | Wt % | 52.75 | 50.59 |
| SiPC1 | Wt % | 12.17 | 7.23 |
| Irgafos 168 | Wt % | 0.08 | 0.08 |
| GF2 | Wt % | 30 | 30 |
| TiO2 | Wt % |  | 2 |
| CB | Wt % |  | 0.1 |
| BPADP | Wt % | 5 | 10 |
| SiPC1 content in polymer composition | % | 18.75 | 12.5 |
| Property |  |  |  |
| Smoke density, DS1.5 | — | 33 | 42 |
| Smoke density, DS-4 | — | 118 | 113 |

These examples show that BPADP can be added to these compositions to improve, for example, flow properties, and that even in the presence of BPADP, still smoke requirements for ASTM E662 (requirements are DS-1.5 below 100 and DS-4 below 200) according to FAR 25.853 can be met, as compositions containing 5% or 10% of BPADP have Ds-4 values below 200. This is beneficial for injection molding of aircraft interior parts requiring meeting FST requirements of FAR 25.853, but not OSU requirements.

Examples 24-27

These examples demonstrate the effect of glass fiber type at 15% and 30% loading levels in compositions containing polycarbonate (PC1) and 12.5% of polydimethylsiloxane/bisphenol A polycarbonate copolymer (SiPC1) on smoke density and mechanical properties. Formulations and results are shown in Table 9.

TABLE 9

| Component | Unit | Ex24 | Ex25 | Ex26 | Ex27 |
|---|---|---|---|---|---|
| PC1 | Wt. % | 61.21 | 61.21 | 74.33 | 74.3 |
| SiPC1 | Wt. % | 8.74 | 8.74 | 10.62 | 10.6 |
| IRGAFOS 168 | Wt. % | 0.05 | 0.05 | 0.05 | 0.05 |
| GF1 | Wt. % | 30 |  | 15 |  |
| GF2 | Wt. % |  | 30 |  | 15 |

TABLE 9-continued

| Component | Unit | Ex24 | Ex25 | Ex26 | Ex27 |
|---|---|---|---|---|---|
| SiPC1 content in polymer composition | % | 12.5 | 12.5 | 12.5 | 12.5 |
| Property |  |  |  |  |  |
| Tensile modulus | MPa | 8867 | 7948 | 5031 | 4846 |
| Tensile strength | MPa | 118 | 60 | 87 | 47 |
| IZOD notched impact at room temp. | kJ/m2 | 15 | 14 | 12 | 21 |

The main effect of the glass fiber type can be found on the mechanical properties. Bonding glass (GF1) outperforms non-bonding glass (GF2), especially with respect to tensile strength, while modulus is also higher, without a significant drop in impact. As such, bonding glass types are preferred to achieve the right combination of low smoke density and good mechanical properties.

Examples 28-35

These examples serve to demonstrate the effect of polycarbonate type on the mechanical properties of compositions containing linear BPA PC (PC1 or PC2), polydimethylsiloxane/bisphenol A polycarbonate copolymer (SiPC1) and 15% and 30% bonding glass fiber (GF1). Formulations and results are shown in Table 10.

TABLE 10

| Component | Unit | Ex28 | Ex29 | Ex30 | Ex31 | Ex32 | Ex33 | Ex34 | Ex35 |
|---|---|---|---|---|---|---|---|---|---|
| PC1 | Wt. % | 61.18 | 0 | 52.44 | 0 | 74.31 | 0 | 63.72 | 0 |
| PC2 | Wt. % | 0 | 61.18 | 0 | 52.42 | 0 | 74.31 | 0 | 63.72 |
| SiPC1 | Wt. % | 8.74 | 8.74 | 17.48 | 17.5 | 10.61 | 10.61 | 21.2 | 21.2 |
| IRGAFOS 168 | Wt. % | 0.08 | 0.08 | 0.08 | 0.08 | 0.08 | 0.08 | 0.08 | 0.08 |
| GF1 | Wt. % | 30 | 30 | 30 | 30 | 15 | 15 | 15 | 15 |
| SiPC1 content in polymer composition | % | 12.5 | 12.5 | 25 | 25 | 12.5 | 12.5 | 25 | 25 |
| Property |  |  |  |  |  |  |  |  |  |
| Tensile modulus | MPa | 8573 | 8778 | 8504 | 8605 | 4728 | 4836 | 4675 | 4863 |
| Tensile strength | MPa | 128 | 135 | 127 | 132 | 90 | 96 | 89 | 95 |
| INI at room temp., 4 mm | kJ/m2 | 19 | 16 | 19 | 18 | 14 | 8 | 17 | 12 |
| Flex modulus | MPa | 7838 | 8022 | 7796 | 8160 | 4537 | 4556 | 4374 | 4591 |
| Flex strength | MPa | 191 | 196 | 190 | 193 | 145 | 150 | 142 | 150 |
| MVR, 300, 1.2 kg | cc/10' | 3.8 | 9.0 | 4.0 | 8.3 | 4.7 | 12.3 | 4.6 | 11.4 |

Comparing compositions containing either PC1 or PC2 but otherwise having the same components in same amounts shows the following: compositions containing PC1 or PC2 have similar modulus and strength; the composition containing PC2 has much higher MVR, due to the lower molecular weight (21,800 g/mol) compared to PC1 (30,000 g/mol), measured at 300° C./1.2 Kg at 360 second dwell according to ISO 1133, than the composition containing PC1, which is beneficial for injection molding; and there is a slight drop in impact properties for the composition containing PC2, but the drop is limited. In summary, the flow of the compositions can be tuned by using different types of polycarbonate without significantly affect other properties, including modulus and strength.

Examples 36-55

These examples show the mechanical properties of compositions containing polycarbonate or polycarbonate copolymer (PC1, PC2, PC5, and HFD), 10 to 50% of glass fiber (GF1) and polydimethylsiloxane/bisphenol A polycarbonate copolymer (SiPC1) on the mechanical properties. Results and formulations are shown in Tables 11A and 11B.

Examples 36-55 show that the mechanical properties, such as modulus and strength, depend mainly on the GF1 content, and to a lesser extent on the polycarbonate type (PC1, PC2, PC5, or HFD). Therefore, the glass fiber loading can be adjusted to achieve a certain modulus or strength, as desired from the actual application.

TABLE 11A

| COMPONENT | Unit | Ex36 | Ex37 | Ex38 | Ex39 | Ex40 | Ex41 | Ex42 | Ex43 | Ex44 | Ex45 |
|---|---|---|---|---|---|---|---|---|---|---|---|
| PC1 | % | 76.84 | | | | 68.09 | | | | 59.34 | |
| PC2 | % | | 76.84 | | | | 68.09 | | | | 59.34 |
| PC5 | % | | | 76.84 | | | | 68.09 | | | |
| HFD | % | | | | 76.84 | | | | 68.09 | | |
| SiPC1 | % | 10.98 | 10.98 | 10.98 | 10.98 | 9.73 | 9.73 | 9.73 | 9.73 | 8.48 | 8.48 |
| IRGAFOS 168 | % | 0.08 | 0.08 | 0.08 | 0.08 | 0.08 | 0.08 | 0.08 | 0.08 | 0.08 | 0.08 |
| Carbon black | % | 0.10 | 0.10 | 0.10 | 0.10 | 0.10 | 0.10 | 0.10 | 0.10 | 0.10 | 0.10 |
| TiO2 | % | 2.00 | 2.00 | 2.00 | 2.00 | 2.00 | 2.00 | 2.00 | 2.00 | 2.00 | 2.00 |
| GF1 | % | 10.00 | 10.00 | 10.00 | 10.00 | 20.00 | 20.00 | 20.00 | 20.00 | 30.00 | 30.00 |
| PROPERTY | | | | | | | | | | | |
| IZOD Notched Impact 3 mm + 23° C. | kJ/m2 | 10 | 7 | 5 | 6 | 10 | 7 | 6 | 7 | 9 | 9 |
| IZOD Un-notched Impact 3 mm + 23° C. | kJ/m2 | 72 | 54 | 46 | 46 | 36 | 35 | 31 | 34 | 30 | 33 |
| Tensile modulus | MPa | 3420 | 3580 | 3830 | 3670 | 5340 | 5770 | 6020 | 5970 | 7590 | 8060 |
| Tensile strength | MPa | 51 | 58 | 65 | 62 | 76 | 80 | 85 | 84 | 88 | 94 |
| Elongation at break | % | 6.2 | 4.9 | 4.4 | 4.3 | 3.1 | 2.8 | 2.5 | 2.6 | 2.2 | 2.2 |
| Flexural modulus | MPa | 3260 | 3490 | 3730 | 3460 | 5010 | 5400 | 5630 | 5430 | 7000 | 7360 |
| Flexural strength | MPa | 112 | 116 | 123 | 114 | 129 | 131 | 136 | 129 | 129 | 137 |
| Density | g/cm$^3$ | 1.27 | 1.26 | 1.26 | 1.26 | 1.35 | 1.34 | 1.34 | 1.34 | 1.43 | 1.43 |
| MVR, 300° C., 1.2 kg | Cc/10 min | 4.2 | 11.3 | 24.8 | 19.7 | 3.7 | 8.8 | 18.1 | 14.3 | 3.8 | 7.7 |

TABLE 11B

| COMPONENT | Unit | Ex46 | Ex47 | Ex48 | Ex49 | Ex50 | Ex51 | Ex52 | Ex53 | Ex54 | Ex55 |
|---|---|---|---|---|---|---|---|---|---|---|---|
| PC1 | % | | | 50.59 | | | | 41.84 | | | |
| PC2 | % | | | | 50.59 | | | | 41.84 | | |
| PC5 | % | 59.34 | | | | 50.59 | | | | 41.84 | |
| HFD | % | | 59.34 | | | | 50.59 | | | | 41.84 |
| SiPC1 | % | 8.48 | 8.48 | 7.23 | 7.23 | 7.23 | 7.23 | 5.98 | 5.98 | 5.98 | 5.98 |
| IRGAFOS 168 | % | 0.08 | 0.08 | 0.08 | 0.08 | 0.08 | 0.08 | 0.08 | 0.08 | 0.08 | 0.08 |
| Carbon black | % | 0.10 | 0.10 | 0.10 | 0.10 | 0.10 | 0.10 | 0.10 | 0.10 | 0.10 | 0.10 |
| TiO2 | % | 2.00 | 2.00 | 2.00 | 2.00 | 2.00 | 2.00 | 2.00 | 2.00 | 2.00 | 2.00 |
| GF1 | % | 30.00 | 30.00 | 40.00 | 40.00 | 40.00 | 40.00 | 50.00 | 50.00 | 50.00 | 50.00 |
| PROPERTY | | | | | | | | | | | |
| IZOD Notched Impact 3 mm + 23° C. | kJ/m2 | 7 | 8 | 9 | 9 | 8 | 9 | 8 | 8 | 8 | 9 |
| IZOD Un-notched Impact 3 mm + 23° C. | kJ/m2 | 31 | 32 | 28 | 31 | 28 | 31 | 25 | 27 | 26 | 26 |
| Tensile modulus | MPa | 8420 | 8200 | 9960 | 10480 | 11000 | 10990 | 12790 | 13260 | 14150 | 13810 |
| Tensile strength | MPa | 100 | 97 | 93 | 102 | 105 | 107 | 103 | 107 | 113 | 113 |
| Elongation at break | % | 2.1 | 2.1 | 1.8 | 2 | 1.8 | 1.9 | 1.7 | 1.7 | 1.7 | 1.7 |
| Flexural modulus | MPa | 7630 | 7280 | 8990 | 9060 | 9590 | 9490 | 11110 | 11290 | 12420 | 11870 |
| Flexural strength | MPa | 142 | 137 | 139 | 145 | 151 | 151 | 148 | 154 | 164 | 157 |
| Density | g/cm$^3$ | 1.42 | 1.41 | 1.54 | 1.53 | 1.52 | 1.52 | 1.64 | 1.64 | 1.65 | 1.63 |
| MVR, 300° C., 1.2 kg | Cc/10 min | 14.3 | 11.8 | 4.2 | 7.9 | 12.5 | 10.6 | 3.9 | 8.1 | 10.3 | 8.8 |

At GF1 contents between 10 to 20 wt. %, based on the total weight of the composition; the composition has a tensile modulus of equal to or higher than 3400 MPa, measured according to ISO 527 at 5 mm/min and at 23° C., a tensile strength of equal to or higher than 50 MPa measured according to ISO 527 at 5 mm/min and at 23° C., an IZOD notched impact of equal to or higher than 5 kJ/m2 measured according to ISO 180 at 5.5 J and at 23° C. on a 3 mm thick sample and a density of equal to or lower than 1.36 g/cm$^3$ measured according to ISO 1183.

At GF1 contents between 20 to 30 wt. %, based on the total weight of the composition; the composition has a tensile modulus of equal to or higher than 5000 MPa, measured according to ISO 527 at 5 mm/min and at 23° C., a tensile strength of equal to or higher than 70 MPa measured according to ISO 527 at 5 mm/min and at 23° C., an IZOD notched impact of equal to or higher than 5 kJ/m$^2$ measured according to ISO 180 at 5.5 J and at 23° C. on a 3 mm thick sample, and a density of equal to or lower than 1.45 g/cm$^3$ measured according to ISO 1183.

At GF1 contents between 30 to 40 wt. %, based on the total weight of the composition; the composition has a tensile modulus of equal to or higher than 7500 MPa, measured according to ISO 527 at 5 mm/min and at 23° C., a tensile strength of equal to or higher than 85 MPa measured according to ISO 527 at 5 mm/min and at 23° C., an IZOD notched impact of equal to or higher than 6 kJ/m$^2$ measured according to ISO 180 at 5.5 J and at 23° C. on a 3 mm thick sample and a density of equal to or lower than 1.55 g/cm$^3$ measured according to ISO 1183.

At GF1 contents between 40 to 50 wt. %, based on the total weight of the composition; the composition has a tensile modulus of equal to or higher than 9500 MPa, measured according to ISO 527 at 5 mm/min and at 23° C., a tensile strength of equal to or higher than 90 MPa measured according to ISO 527 at 5 mm/min and at 23° C., an IZOD notched impact of equal to or higher than 7 kJ/m$^2$ measured according to ISO 180 at 5.5 J and at 23° C. on a 3 mm thick sample and a density of equal to or lower than 1.66 g/cm3 measured according to ISO 1183.

The singular forms "a," "an," and "the" include plural referents unless the context clearly dictates otherwise. "Or" means "and/or." The endpoints of all ranges directed to the same component or property are inclusive and independently combinable. The suffix "(s)" as used herein is intended to include both the singular and the plural of the term that it modifies, thereby including at least one of that term (e.g., "colorant(s)" includes at least one colorant). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs.

As used herein, a "combination" is inclusive of blends, mixtures, alloys, reaction products, and the like. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Unless otherwise indicated, exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxy groups; $C_{6-10}$ aryloxy such as phenoxy; $C_{1-6}$ alkylthio; $C_{1-6}$ or $C_{1-3}$ alkylsulfinyl; C1-6 or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. An aircraft component,
    wherein the component is a molded or extruded interior aircraft component comprising a polycarbonate composition comprising:
    a first polycarbonate selected from a polycarbonate homopolymer, a poly(aliphatic ester-carbonate), or a combination comprising at least one of the foregoing;
    a second polymer different from the first polycarbonate, the second polymer comprising a poly(carbonate-siloxane) copolymer, a polydialkylsiloxane, a silicone graft copolymer, or a combination comprising at least one of the foregoing, wherein siloxane units in the second polymer are present in the polycarbonate composition in an amount of 0.3 to 3 wt. %, based on the total weight of the polycarbonate composition; and
    10 to 50 wt. % of glass fiber, based on the total weight of the polycarbonate composition;
    wherein a sample of the polycarbonate composition has:
    an ASTM E662 smoke test Ds-1.5 value of less than 100 and Ds-4 value of less than 200 when measured at a thickness of 3 mm,
    a flame time of less than 15 seconds, a burn length of less than 152 mm, and a drip extinguishing time of less than 5 seconds, each measured using the method of FAR F25.5, in accordance with FAR 25.853(a) at a thickness of 3 mm.

2. The aircraft component of claim 1, wherein the first polycarbonate comprises linear polycarbonate homopolymer comprising repeating units of the formula

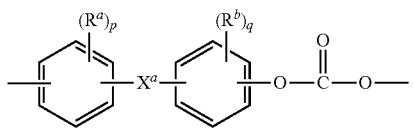

wherein
$R^a$ and $R^b$ are each independently a $C_{1-12}$ alkyl group, $C_{1-12}$ alkenyl, $C_{3-8}$ cycloalkyl, or $C_{1-12}$ alkoxy,
p and q are each independently integers of 0 to 4, and
$X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group.

3. The aircraft component of claim 2, wherein the linear polycarbonate homopolymer comprises bisphenol A carbonate units.

4. The aircraft component of claim 2, wherein the linear polycarbonate has an average molecular weight of 18,000 to 25,000 g/mol; and wherein the composition has a melt volume flow rate of about 8 to about 25 cc/10 min, measured at 300° C./1.2 Kg at 360 second dwell according to ISO 1133.

5. The aircraft component of claim 1, wherein the first polycarbonate comprises a poly(aliphatic ester-carbonate), and the poly(aliphatic ester-carbonate) comprises bisphenol A sebacate ester units and bisphenol A carbonate units in a molar ratio of 2:98 to 8:92.

6. The aircraft component of claim 1, wherein the second polymer comprises a poly(carbonate-siloxane) copolymer comprising first repeating units and second repeating units, wherein
the first repeating units are bisphenol carbonate units of the formula

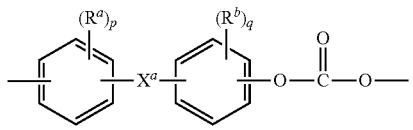

wherein
$R^a$ and $R^b$ are each independently $C_{1-12}$ alkyl, $C_{1-12}$ alkenyl, $C_{3-8}$ cycloalkyl, or $C_{1-12}$ alkoxy,
p and q are each independently 0 to 4, and
$X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; and the second repeating units are polysiloxane units of the formula

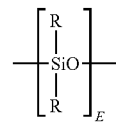

wherein
R is each independently a $C_{1-13}$ monovalent hydrocarbon group, and
E has an average value of 2 to 200.

7. The aircraft component of claim 6, wherein the second repeating units are siloxane units of the formulas

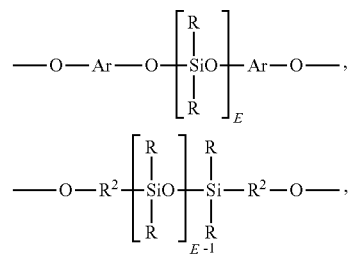

or a combination comprising at least one of the foregoing, wherein
R is each independently a $C_{1-13}$ monovalent hydrocarbon group,
Ar is each independently a $C_{6-30}$ aromatic group,
$R^2$ is each independently a $C_{2-8}$ alkylene group, and
E has an average value of 2 to 200.

8. The aircraft component of claim 7, wherein the siloxane units are of the formula

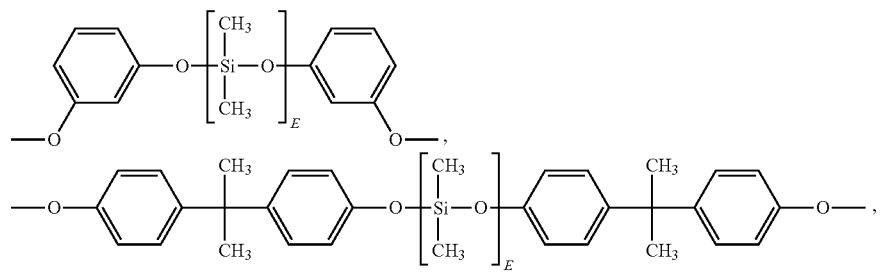

or a combination comprising at least one of the foregoing, wherein E has an average value of 2 to 200.

9. The aircraft component of claim 7, wherein the siloxane units are of the formula

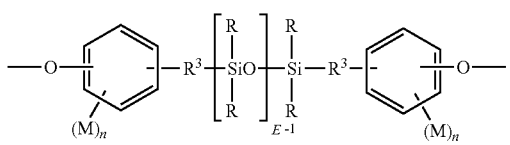

wherein

R is each independently a $C_{1-13}$ monovalent hydrocarbon group, $R^3$ is independently a divalent $C_{2-8}$ aliphatic group, M is each independently a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, or a combination comprising at least one of the foregoing, n is each independently 0, 1, 2, 3, or 4, and E has an average value of 2 to 200.

10. The aircraft component of claim 7, wherein the siloxane units are siloxane units of the formula

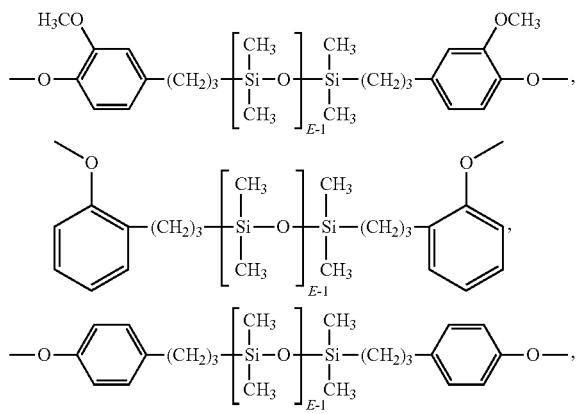

or a combination comprising at least one of the foregoing, wherein E has an average value of 2 to 200.

11. The aircraft component of claim 10, wherein E has an average value of 5 to 120.

12. The aircraft component of claim 1, wherein the second polymer is a polydialkylsiloxane having a viscosity from 10 to 100,000,000 mPa-s at 25° C., and wherein the alkyl groups each independently comprises 1 to 10 carbon atoms.

13. The aircraft component of claim 12, wherein the polydialkylsiloxane is a polydimethylsiloxane having a viscosity from 50 to 1,000 mPa-s at 25° C.

14. The aircraft component of claim 1, wherein the second polymer is a silicone graft copolymer comprising a core comprising a polydiorganosiloxane and a vinyl-based monomer graft copolymerized with the core to form a shell.

15. The aircraft component of claim 1, wherein glass fiber has a length of about 1 to about 10 millimeters and a diameter of about 5 to about 20 micrometers.

16. The aircraft component of claim 1, wherein glass fiber is bonding glass fiber that bounds with a polycarbonate, a polyphenylene ether or a polyamide.

17. The aircraft component of claim 1, wherein the glass fiber is present in an amount of 10 to 20 wt. %, based on the total weight of the composition; and wherein the component has:

a tensile modulus of equal to or higher than 3400 MPa, measured according to ISO 527 at 5 mm/min and at 23° C., a tensile strength of equal to or higher than 50 MPa measured according to ISO 527 at 5 mm/min and at 23° C., an IZOD notched impact of equal to or higher than 5 $kJ/m^2$ measured according to ISO 180 at 5.5 J and at 23° C. on a 3 mm thick sample, and a density of equal to or lower than 1.36 $g/cm^3$ measured according to ISO 1183.

18. The aircraft component of claim 1, wherein the glass fiber is present in an amount of 20 to 30 wt. %, based on the total weight of the composition; and wherein the component has:

a tensile modulus of equal to or higher than 5000 MPa, measured according to ISO 527 at 5 mm/min and at 23° C., a tensile strength of equal to or higher than 70 MPa measured according to ISO 527 at 5 mm/min and at 23° C., an IZOD notched impact of equal to or higher than 5 $kJ/m^2$ measured according to ISO 180 at 5.5 J and at 23° C. on a 3 mm thick sample, and a density of equal to or lower than 1.45 $g/cm^3$ measured according to ISO 1183.

19. The aircraft component of claim 1, wherein the glass fiber is present in an amount of 30 to 40 wt. %, based on the total weight of the composition; and wherein the component has:

a tensile modulus of equal to or higher than 7500 MPa, measured according to ISO 527 at 5 mm/min and at 23° C., a tensile strength of equal to or higher than 85 MPa measured according to ISO 527 at 5 mm/min and at 23° C., an IZOD notched impact of equal to or higher than 6 $kJ/m^2$ measured according to ISO 180 at 5.5 J and at 23° C. on a 3 mm thick sample, and a density of equal to or lower than 1.55 $g/cm^3$ measured according to ISO 1183.

20. The aircraft component of claim 1, wherein the glass fiber is present in an amount of 40 to 50 wt. %, based on the total weight of the composition; and wherein the component has:

a tensile modulus of equal to or higher than 9500 MPa, measured according to ISO 527 at 5 mm/min and at 23° C., a tensile strength of equal to or higher than 90 MPa measured according to ISO 527 at 5 mm/min and at 23° C., an IZOD notched impact of equal to or higher than 7 kJ/m2 measured according to ISO 180 at 5.5 J and at 23° C. on a 3 mm thick sample, and a density of equal to or lower than 1.66 g/cm3 measured according to ISO 1183.

21. The aircraft component of claim 1, wherein the polycarbonate composition comprises, based on the weight of the composition, 25 to 90 wt. % of a linear bisphenol A polycarbonate homopolymer;

a poly(carbonate-siloxane), present in an amount wherein siloxane units in the second polymer are present in the polycarbonate composition in an amount of 0.3 to 3 wt. %, based on the total weight of the polymer composition; and comprising bisphenol A carbonate units, and siloxane units of the formula

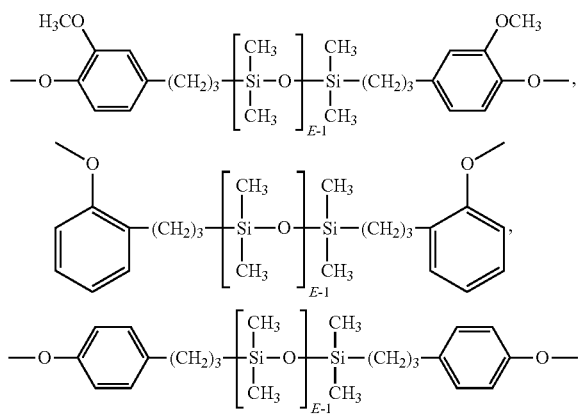

or a combination comprising at least one of the foregoing, wherein E has an average value of 2 to 200;

wherein the poly(carbonate-siloxane) comprises 0.5 to 55 wt. % of siloxane units based on the total weight of the poly(carbonate-siloxane); and 10 wt. % to 50 wt. % of glass fiber;

wherein a sample of the polycarbonate composition has an ASTM E662 smoke test Ds-1.5 value of less than 100 and DS-4 value of less than 200 when measured at a thickness of 3 mm, a flame time of less than 15 seconds, a burn length of less than 152 mm, and a drip extinguishing time of less than 5 seconds, each measured using the method of FAR F25.5, in accordance with FAR 25.853(a) at a thickness of 3 mm.

22. The aircraft component of claim 1, wherein the polycarbonate composition comprises, based on the weight of the composition, 25 to 90 wt. % of a poly(aliphatic ester-carbonate) comprising bisphenol A sebacate ester units and bisphenol A carbonate units in a molar ratio of 2:98 to 8:92; and a poly(carbonate-siloxane), present in an amount wherein siloxane units in the second polymer are present in the polycarbonate composition in an amount of 0.3 to 3 wt. %, based on the total weight of the polymer composition; comprising bisphenol A carbonate units, and siloxane units of the formula

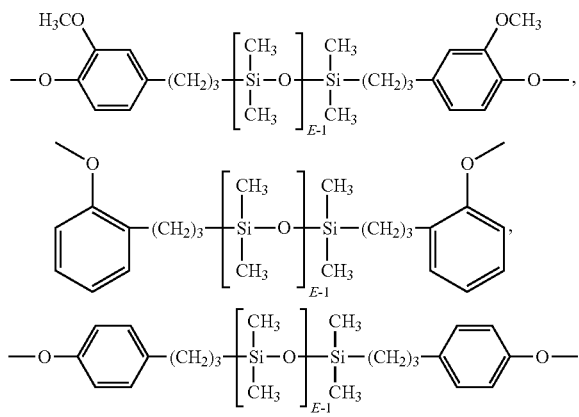

or a combination comprising at least one of the foregoing, wherein E has an average value of 2 to 200;

wherein the poly(carbonate-siloxane) comprises 0.5 to 55 wt. % of siloxane units based on the total weight of the poly(carbonate-siloxane); and 10 wt. % to 50 wt. % of glass fiber;

wherein a sample of the polycarbonate composition has an ASTM E662 smoke test Ds-1.5 value of less than 100 and DS-4 value of less than 200 when measured at a thickness of 3 mm, a flame time of less than 15 seconds, a burn length of less than 152 mm, and a drip extinguishing time of less than 5 seconds, each measured using the method of FAR F25.5, in accordance with FAR 25.853(a) at a thickness of 3 mm.

23. The aircraft component of claim 1, wherein the polycarbonate composition further comprises 0.2 to 10 wt. % of titanium dioxide.

24. The aircraft component of claim 1, wherein the polycarbonate composition further comprises an aromatic organophosphorus compound having at least one organic aromatic group and at least one phosphorus-containing group, or an organic compound having at least one phosphorus-nitrogen bond.

25. The aircraft component of claim 24, wherein the organophosphorus compound is bisphenol A bis(diphenyl phosphate), triphenyl phosphate, resorcinol bis(diphenyl phosphate), tricresyl phosphate, a phenol/bi-phenol polyphosphate, or a combination comprising at least one of the foregoing.

26. The aircraft component of claim 24, wherein organophosphorus compound containing a nitrogen-phosphorus bond is a phosphazene, phosphorus ester amide, phosphoric acid amide, phosphonic acid amide, phosphinic acid amide, tris(aziridinyl) phosphine oxide, a combination comprising at least one of the foregoing.

27. The aircraft component of claim 24, wherein the organophosphorus compound is effective to provide phosphorus in an amount of 0.1% to 1.0% of phosphorus, based on the weight of the polycarbonate composition.

28. The aircraft component of claim 1, wherein no or substantially no brominated polycarbonate is present in the polycarbonate composition.

29. The aircraft component of claim 1, wherein the polycarbonate composition further comprising no more than 5 wt. % based on the weight of the composition of a processing aid, a heat stabilizer, an antioxidant, an ultra violet light absorber, a colorant, or a combination comprising at least one of the foregoing.

30. The aircraft component of claim 1, wherein the polycarbonate composition comprises, based on the weight of the composition, 32.5 to 90 wt. % of a of a linear bisphenol A polycarbonate homopolymer having a molecular weight of about 17,000 g/mol to about 23,000 g/mol as determined by gel permeation chromatography using polycarbonate standards;

a poly(carbonate-siloxane) present in an amount wherein siloxane units in the second polymer are present in the polycarbonate composition in an amount of 0.3 to 3 wt. %, based on the total weight of the polymer composition; comprising bisphenol A carbonate units, and siloxane units of the formula

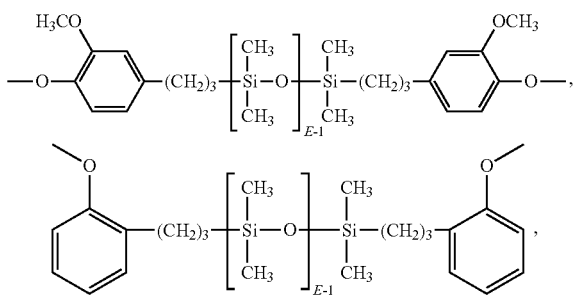

or a combination comprising at least one of the foregoing, wherein E has an average value of 2 to 200;
wherein the poly(carbonate-siloxane) comprises 0.5 to 55 wt. % of siloxane units based on the total weight of the poly(carbonate-siloxane); and
10 to 35 wt. % of glass fiber; and
0 to 5 wt. % of titanium dioxide;
wherein a sample of the polycarbonate composition has an ASTM E662 smoke test Ds-1.5 value of less than 100 and DS-4 value of less than 200 when measured at a thickness of 3 mm,
a flame time of less than 15 seconds, a burn length of less than 152 mm, and a drip extinguishing time of less than 5 seconds, each measured using the method of FAR F25.5, in accordance with FAR 25.853(a) at a thickness of 3 mm.

31. The aircraft component of claim 1, wherein the polycarbonate composition comprises, based on the weight of the composition,
31.5 to 90 wt. % of a of a linear bisphenol A polycarbonate homopolymer having a molecular weight of about 25,000 g/mol to about 35,000 g/mol as determined by gel permeation chromatography using polycarbonate standards;
a poly(carbonate-siloxane) present in an amount wherein siloxane units in the second polymer are present in the polycarbonate composition in an amount of 0.3 to 3 wt. %, based on the total weight of the polymer composition; comprising
bisphenol A carbonate units, and
siloxane units of the formula

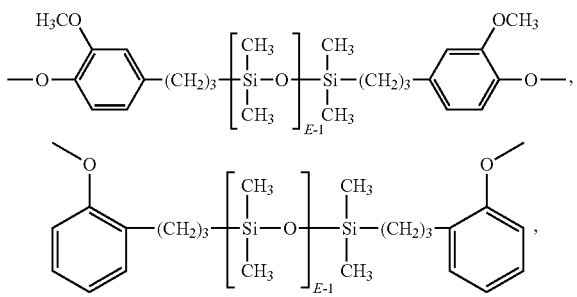

or a combination comprising at least one of the foregoing, wherein E has an average value of 2 to 200;
wherein the poly(carbonate-siloxane) comprises 0.5 to 55 wt. % of siloxane units based on the total weight of the poly(carbonate-siloxane); and
10 to 35 wt. % of glass fiber; and
0.5 to 5 wt. % of titanium dioxide;
wherein a sample of the polycarbonate composition has an ASTM E662 smoke test Ds-1.5 value of less than 100 and DS-4 value of less than 200 when measured at a thickness of 3 mm,
a flame time of less than 15 seconds, a burn length of less than 152 mm, and a drip extinguishing time of less than 5 seconds, each measured using the method of FAR F25.5, in accordance with FAR 25.853(a) at a thickness of 3 mm.

32. The aircraft component of claim 1, wherein the polycarbonate composition comprises, based on the weight of the composition,
25 to 90 wt. % of a poly(aliphatic ester-carbonate) comprising bisphenol A sebacate ester units and bisphenol A carbonate units in a molar ratio of 2:98 to 8:92; and
a poly(carbonate-siloxane) present in an amount wherein siloxane units in the second polymer are present in the polycarbonate composition in an amount of 0.3 to 3 wt. %, based on the total weight of the polymer composition; comprising
bisphenol A carbonate units, and
siloxane units of the formula

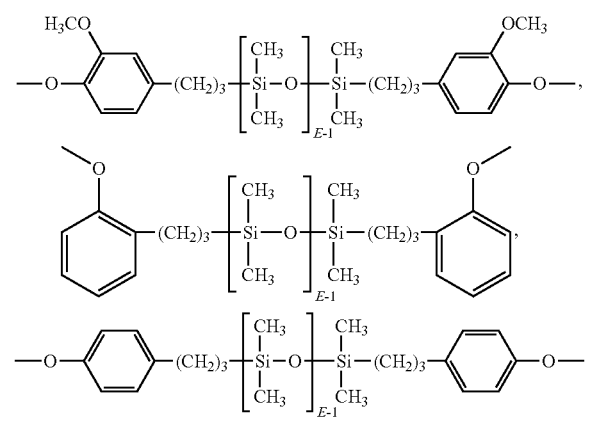

or a combination comprising at least one of the foregoing, wherein E has an average value of 2 to 200;
wherein the poly(carbonate-siloxane) comprises 0.5 to 55 wt. % of siloxane units based on the total weight of the poly(carbonate-siloxane); and
10 wt. % to 35 wt. % of glass fiber; and
0.2 to 5 wt. % of titanium dioxide;
wherein a sample of the polycarbonate composition has an ASTM E662 smoke test Ds-1.5 value of less than 100 and DS-4 value of less than 200 when measured at a thickness of 3 mm,
a flame time of less than 15 seconds, a burn length of less than 152 mm, and a drip extinguishing time of less than 5 seconds, each measured using the method of FAR F25.5, in accordance with FAR 25.853(a) at a thickness of 3 mm.

33. The aircraft component of claim 1, wherein the component is a profile, panel, panel insert, air flow regulator, call button, oxygen system housing, oxygen system cover, window frame, window housing, lighting rail, grip rail, passenger service unit component, luggage bin component, profile, washing table, side wall component, food tray, in-flight entertainment housing, display bezel, crew communication device component, seat component, side-arm panel, literature pocket, tray table, monitor cover, kick panel, tray table arm, foot rests seat arm, headrest, electronic housing, air ducting component, grill, panel fixation, cable bracket, door handle, hinge, trolley component or connector.

\* \* \* \* \*